(12) United States Patent
Namiki et al.

(10) Patent No.: US 11,873,370 B2
(45) Date of Patent: Jan. 16, 2024

(54) POLYCARBONATE RESIN COMPOSITION, MOLDED ARTICLE, AND MULTILAYER BODY

(71) Applicant: MITSUBISHI CHEMICAL CORPORATION, Chiyoda-ku (JP)

(72) Inventors: Shingo Namiki, Tokyo (JP); Yuuichi Hirami, Tokyo (JP); Tomoaki Kanemasa, Tokyo (JP); Taiki Shimada, Tokyo (JP); Masato Ando, Tokyo (JP); Akira Kosuge, Tokyo (JP); Shigeki Ohta, Tokyo (JP); Yuuichirou Kutsunugi, Tokyo (JP); Asami Kakiuchi, Tokyo (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 324 days.

(21) Appl. No.: 16/972,880

(22) PCT Filed: Jun. 10, 2019

(86) PCT No.: PCT/JP2019/022919
§ 371 (c)(1),
(2) Date: Dec. 7, 2020

(87) PCT Pub. No.: WO2019/235644
PCT Pub. Date: Dec. 12, 2019

(65) Prior Publication Data
US 2021/0253788 A1    Aug. 19, 2021

(30) Foreign Application Priority Data

Jun. 8, 2018  (JP) ................................ 2018-110424
May 27, 2019 (JP) ................................ 2019-098659
May 27, 2019 (JP) ................................ 2019-098675

(51) Int. Cl.
  *C08G 64/02*  (2006.01)
  *B32B 27/08*  (2006.01)
  (Continued)

(52) U.S. Cl.
  CPC .......... *C08G 64/0208* (2013.01); *B32B 27/08* (2013.01); *B32B 27/365* (2013.01);
  (Continued)

(58) Field of Classification Search
  CPC .... C08G 64/0208; C08G 64/06; C08G 64/35; B32B 27/08; B32B 27/365;
  (Continued)

(56) References Cited

U.S. PATENT DOCUMENTS 7,365,148 B2  4/2008  Ono et al.
8,865,855 B2  10/2014 Fuji et al.
(Continued)

FOREIGN PATENT DOCUMENTS

JP   2009-79190 A   4/2009
JP   2010-116501 A  5/2010
(Continued)

OTHER PUBLICATIONS

International Preliminry Report on Patentability and Written Opinion dated Dec. 17, 2020 in PCT/JP2019/022919 (submitting English translation only), 7 pages.

(Continued)

*Primary Examiner* — Michael M. Bernshteyn
(74) *Attorney, Agent, or Firm* — Oblon, McClelland, Maier & Neustadt, L.L.P.

(57) ABSTRACT

A polycarbonate resin composition may include a first polycarbonate resin and a second polycarbonate resin, which a molded article may include, and a multilayer body may have a resin layer A including the polycarbonate resin (Continued)

composition and a resin layer B including a resin different from the resin layer A. The first polycarbonate resin may include 40% by weight or more of a structural unit of formula (1)

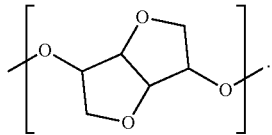

The second polycarbonate resin may include less than 40% by weight of the structural unit of formula (1). The weight ratio of the first polycarbonate resin to the second polycarbonate resin, the first polycarbonate resin/the second polycarbonate resin, may be in a range of from 55/45 to 99/1. The polycarbonate resin composition may have two or more glass transition temperatures.

23 Claims, 1 Drawing Sheet

(51) Int. Cl.
*B32B 27/36* (2006.01)
*C08G 64/06* (2006.01)
*C08G 64/30* (2006.01)
*C08L 33/08* (2006.01)

(52) U.S. Cl.
CPC ........... *C08G 64/06* (2013.01); *C08G 64/305* (2013.01); *C08L 33/08* (2013.01); *B32B 2250/02* (2013.01); *B32B 2250/03* (2013.01); *B32B 2250/04* (2013.01); *B32B 2307/732* (2013.01); *B32B 2333/08* (2013.01); *B32B 2369/00* (2013.01); *B32B 2605/08* (2013.01); *C08L 2203/30* (2013.01); *C08L 2205/025* (2013.01); *C08L 2205/035* (2013.01)

(58) Field of Classification Search
CPC ............ B32B 2550/02; B32B 2550/03; B32B 2550/04; B32B 2307/732; B32B 2333/08; B32B 2369/00; B32B 2605/08; C08L 33/08; C08L 2203/30; C08L 2205/025; C08L 2205/035
USPC ........................................................ 525/462
See application file for complete search history.

(56) References Cited

U.S. PATENT DOCUMENTS

| | | | |
|---|---|---|---|
| 9,006,351 B2 | 4/2015 | Yokogi et al. | |
| 9,193,823 B2 | 11/2015 | Fuji et al. | |
| 9,193,864 B2* | 11/2015 | Steendam | C08L 69/00 |
| 2006/0149024 A1 | 7/2006 | Ono et al. | |
| 2010/0190953 A1 | 7/2010 | Fuji et al. | |
| 2011/0257362 A1 | 10/2011 | Fuji et al. | |
| 2012/0328855 A1 | 12/2012 | Yokogi et al. | |
| 2013/0131271 A1 | 5/2013 | Yokogi et al. | |
| 2013/0345347 A1* | 12/2013 | Steendam | C08L 69/00 524/151 |
| 2014/0179818 A1 | 6/2014 | Takashima et al. | |
| 2014/0296473 A1 | 10/2014 | Fuji et al. | |
| 2017/0240741 A1* | 8/2017 | Ichihara | C08L 69/00 |
| 2018/0094133 A1* | 4/2018 | Ichihara | C08L 69/00 |
| 2018/0237636 A1* | 8/2018 | Ichihara | C08L 13/00 |

FOREIGN PATENT DOCUMENTS

| | | |
|---|---|---|
| JP | 2012-214666 A | 11/2012 |
| JP | 2013-108059 A | 6/2013 |
| JP | 2014-208800 A | 11/2014 |
| JP | 2015-143028 A | 8/2015 |
| JP | 2015-194754 A | 11/2015 |
| JP | 2016-108386 A | 6/2016 |
| JP | 2016-139104 A | 8/2016 |
| JP | 2017-43689 A | 3/2017 |
| JP | 2017-88774 A | 5/2017 |
| JP | 2018-59081 A | 4/2018 |
| WO | WO 2004/111106 A1 | 12/2004 |
| WO | WO 2007/148604 A1 | 12/2007 |

OTHER PUBLICATIONS

International Search Report dated Aug. 27, 2019 in PCT/JP2019/022919 filed on Jun. 10, 2019, 1 page.
Office Action dated Oct. 4, 2022, in corresponding Japanese Patent Application No. 2020-523218 (with English Translation), 6 pages.
Combined Chinese Office Action and Search Report dated Jul. 6, 2022 in Chinese Patent Application No. 201980039100.6 (with English Translation of Office Action only), 10 pages.
Office Action dated Jan. 24, 2023, in corresponding Japanese Patent Application No. 2020-523218 (with English Translation), 8 pages.
Extended European Search Report dated Jul. 6, 2021 in corresponding European Patent Application No. 19815683.8, 5 pages.

* cited by examiner

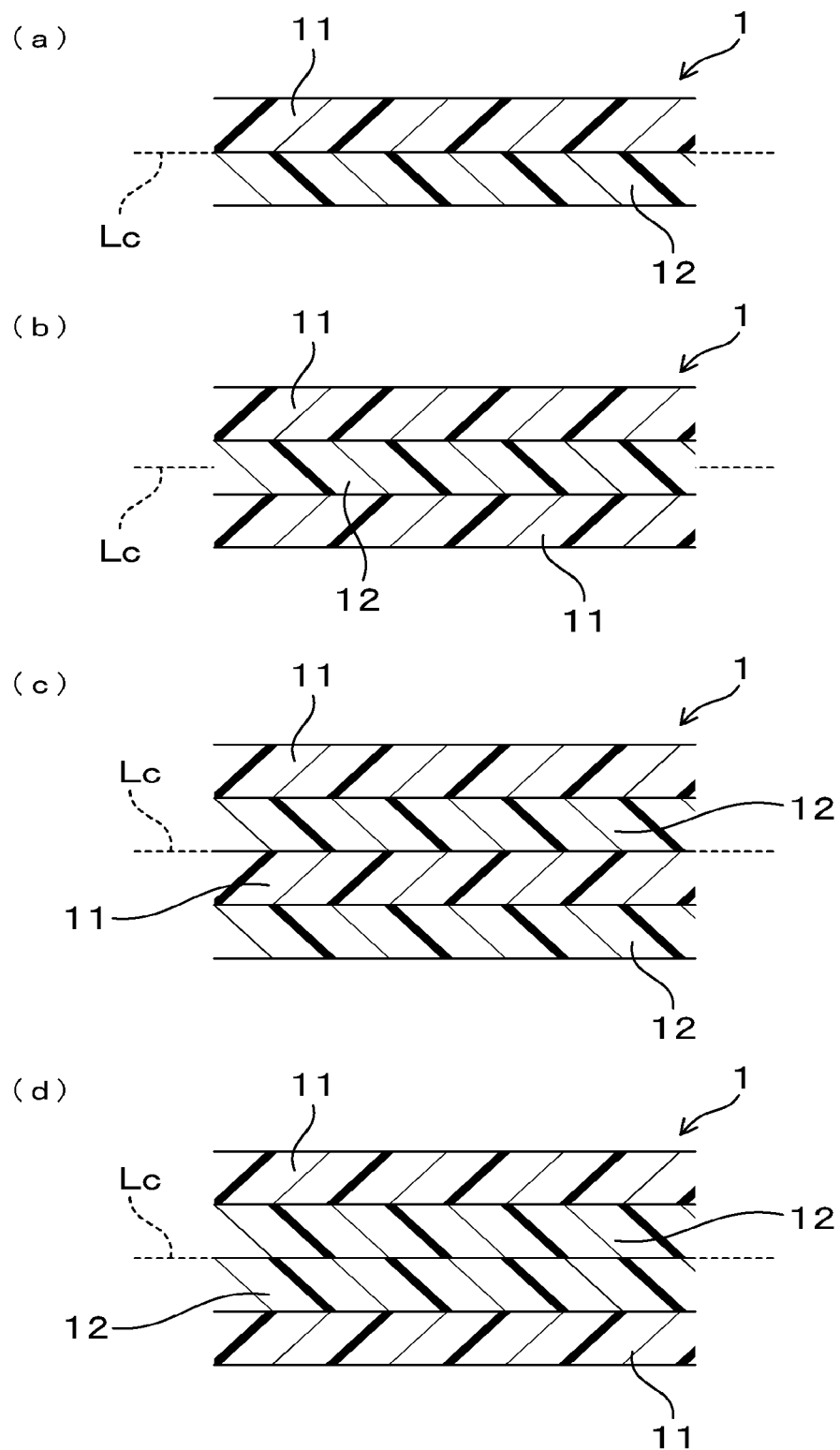

POLYCARBONATE RESIN COMPOSITION, MOLDED ARTICLE, AND MULTILAYER BODY

TECHNICAL FIELD

The present disclosure relates to a polycarbonate resin composition containing two or more types of polycarbonate resins, and a molded article and a multilayer body using the same.

BACKGROUND ART

A polycarbonate resin generally includes bisphenols as a monomer component, and has been widely used as a so-called engineering plastic in electric/electronic parts, automobile parts, optical recording media, an optical field such as a lens, and the like, taking advantages of superiorities of transparency, heat resistance, mechanical strength, and the like. On the other hand, there is concern about exhaustion of petroleum resources and global warming caused by increase of carbon dioxide emissions, and thus development of plastics using carbon-neutral plant-derived monomers as raw materials has been demanded. Under such circumstances, in recent years, a polycarbonate resin produced using isosorbide (hereinafter referred to as "ISB" in some cases), which is a plant-derived raw material, has been developed, and has come into practical use for automobile parts applications, optical parts, and glass substitutes (see, for example, Patent Documents 1 and 2).

The polycarbonate resin obtained from ISB has not only excellent optical properties, but also extremely excellent weather resistance and surface hardness as compared with conventional general-purpose aromatic polycarbonate resins. Utilizing these properties, usages such as a polarizer protective film (Patent Document 5) and a retardation film (Patent Document 6) which are constituent members of a polarizing plate, and a surface protective film and a decorative film for automobile parts, electric/electronic parts, building materials, and the like (Patent Documents 7 and 8) have been developed. On the other hand, the polycarbonate resin obtained from ISB is required to be further improved in mechanical properties such as tensile elongation and impact resistance at a portion where stress is concentrated. To address such a problem, Patent Document 3 discloses a method for improving impact resistance by incorporating a core-shell type elastomer in a polycarbonate resin. Patent Document 4 discloses a polycarbonate resin composition having an improved balance of physical properties such as heat resistance, fluidity, and impact resistance. The polycarbonate resin obtained by using ISB is hereinafter referred to as an "ISB-based polycarbonate resin" as appropriate.

PRIOR ART LITERATURE

Patent Documents

Patent Document 1: WO 2004/111106
Patent Document 2: WO 2007/148604
Patent Document 3: JP 2012-214666 A
Patent Document 4: JP 2014-208800 A
Patent Document 5: JP 2015-194754 A
Patent Document 6: JP 2016-139104 A
Patent Document 7: JP 2009-79190 A
Patent Document 8: JP 2015-143028 A

SUMMARY OF INVENTION

The present inventors have found that although an improvement of the excellent impact resistance can be expected by containing the core-shell type elastomer in the polycarbonate resin as in Patent Document 3, etc., the optical properties originally possessed by the resin may be impaired and in a moist heat environment, toughness may be impaired in some cases under severe conditions such as an environment in which temperature changes or humidity changes are repeated.

Further, as a result of repeated studies, the present inventors have found that there is room for further improvement in moist heat resistance and chemical resistance in the polycarbonate resin composition described in Patent Document 4, for example.

As described above, there is still room for improvement in the polycarbonate resin composition in terms of providing excellent optical properties such as transparency and also other excellent properties such as mechanical properties and durability. That is, the present disclosure has been made in view of such a background, and aims to provide a polycarbonate resin composition that enables to obtain a high-quality molded article. Specifically, it is intended to provide a resin composition that is excellent in a plurality of properties among transparency, heat resistance, color tone, moldability, chemical resistance, moist heat resistance, and impact resistance in well balance, more specifically, a polycarbonate resin composition that is excellent in transparency and heat resistance, and further is excellent in at least one of moldability, chemical resistance, and moist heat resistance, a molded article obtained by molding this resin composition, and a multilayer body including a layer containing the resin composition.

Means for Solving the Problems

The present inventors have found that a polycarbonate resin composition that contains at least two types of polycarbonate resins each having a specific structural unit in a predetermined ratio, and has two or more glass transition temperatures, can solve the above problems, and consequently reached the present disclosure. That is, the gist of the present disclosure lies in the following [1] to [23].

[1] A polycarbonate resin composition, including at least:
a first polycarbonate resin containing 40% by weight or more of a structural unit represented by the following formula (1); and
a second polycarbonate resin containing less than 40% by weight of the structural unit, wherein
a weight ratio of the first polycarbonate resin and the second polycarbonate resin is 55/45 to 99/1 in the first polycarbonate resin/second polycarbonate resin, and
the polycarbonate resin composition has two or more glass transition temperatures.

[Chem. 1]

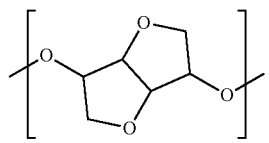

(1)

[2] The polycarbonate resin composition according to [1], in which at least one of the first polycarbonate resin and the second polycarbonate resin preferably includes a structural unit derived from one or more dihydroxy compounds selected from the group consisting of an aliphatic dihydroxy compound, an alicyclic dihydroxy compound, and an ether group-containing dihydroxy compound other than a dihydroxy compound represented by the formula (1).

[3] The polycarbonate resin composition according to [1] or [2], in which the first polycarbonate resin preferably contains 40% by weight or more and 80% by weight or less of the structural unit represented by the formula (1).

[4] The polycarbonate resin composition according to any one of [1] to [3], in which the second polycarbonate resin preferably contains 1° by weight or more and 35° by weight or less of the structural unit represented by the formula (1).

[5] The polycarbonate resin composition according to any one of [1] to [4], in which the second polycarbonate resin preferably has a number average molecular weight measured by $^1$H-NMR of 17000 or more and 50000 or less.

[6] The polycarbonate resin composition according to any one of [1] to [4], in which the second polycarbonate resin has a number average molecular weight measured by 1H-NMR of 6000 or more and 12000 or less.

[7] The polycarbonate resin composition according to any one of [1] to [6], in which the second polycarbonate resin preferably has a melt viscosity of 1800 Pa·s or more and 3000 Pa·s or less at a measurement temperature of 220° C. and a shear rate of 91.2 sec$^{-1}$.

[8] The polycarbonate resin composition according to any one of [1] to [6], in which the second polycarbonate resin preferably has a melt viscosity of 80 Pa·s or more and 500 Pa·s or less at a measurement temperature of 220° C. and a shear rate of 91.2 sec$^{-1}$.

[9] The polycarbonate resin composition according to any one of [1] to [8], in which the second polycarbonate resin preferably has a glass transition temperature of 40° C. or higher and 80° C. or lower.

[10] The polycarbonate resin composition according to any one of [1] to [9], in which the second polycarbonate resin preferably contains of 45% by weight or more of a structural unit represented by the following formula (2).

[Chem. 2]

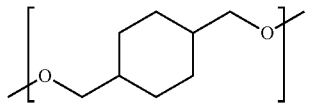

(2)

[11] The polycarbonate resin composition according to [1], preferably, further including a third polycarbonate resin containing 50% by weight or more of a structural unit represented by the following formula (3) and/or an acrylic resin containing 50% by weight or more of a structural unit represented by the following formula (4):

[Chem. 3]

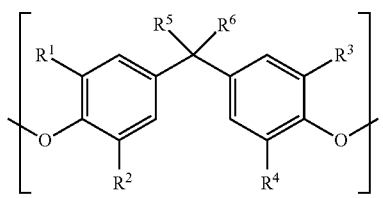

(3)

In the formula (3), $R^1$ to $R^6$ are each independently a hydrogen atom or an alkyl group having 1 to 10 carbon atoms which may have a substituent.

[Chem. 4]

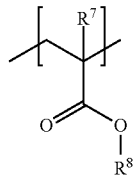

(4)

In the formula (4), $R^7$ is a hydrogen atom or an alkyl group having 1 to 10 carbon atoms which may have a substituent. $R^8$ is an aryl group which may have a substituent or an aralkyl group which may have a substituent.

[12] The polycarbonate resin composition according to [11], preferably including 60 parts by weight or more and 95 parts by weight or less of the first polycarbonate resin, 3 parts by weight or more and 40 parts by weight or less of the second polycarbonate resin, and 0.01 parts by weight or more and 2 parts by weight or less of a total of the third polycarbonate resin and the acrylic resin, with respect to 100 parts by weight of a total of the first polycarbonate resin, the second polycarbonate resin, the third polycarbonate resin, and the acrylic resin.

[13] The polycarbonate resin composition according to [11] or [12], in which the first polycarbonate resin and the second polycarbonate resin each preferably contain a structural unit represented by the following formula (2).

[Chem. 5]

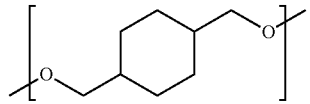

(2)

[14] The polycarbonate resin composition according to any one of [11] to [13], in which the glass transition temperature of the first polycarbonate resin is 90° C. or higher and 160° C. or lower, and the glass transition temperature of the second polycarbonate resin is 40° C. or higher and 110° C. or lower.

[15] A molded article, including the polycarbonate resin composition according to any one of [1] to [14].

[16] The molded article according to [15], preferably including an automobile interior part or an automobile exterior part.

[17] The molded article according to [15], preferably being used for an on-vehicle display, a car navigation, a car audio, a console panel, a dashboard, or a door trim article.

[18] A multilayer body, having one or more resin layers A containing the polycarbonate resin composition according to any one of [1] to [9] and one or more resin layers B containing a resin different from the resin of the resin layer A.

[19] The multilayer body according to [18], in which in a cross section in a layered direction of the multilayer body, a layered structure of the resin layer A and the resin layer B is preferably asymmetric across a center line of a thickness of the multilayer body in terms of thickness and/or material.

[20] The multilayer body according to [18] or [19], preferably having a total thickness of 10 µm or more and 500 µm or less.

[21] The multilayer body according to any one of [18] to [20], in which a thickness ratio of the resin layer A and the resin layer B is preferably 0.02 to 50 in the resin layer B/the resin layer A.

[22] The multilayer body according to any one of [18] to [21], in which the second polycarbonate resin preferably contains a structural unit represented by the following formula (2).

[Chem. 6]

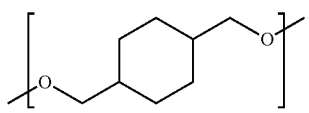

(2)

[23] The multilayer body according to any one of [18] to [22], in which the glass transition temperature of the first polycarbonate resin is preferably 90° C. or higher and 160° C. or lower, and the glass transition temperature of the second polycarbonate resin is preferably 40° C. or higher and 80° C. or lower.

According to the polycarbonate resin composition, it is possible to obtain a high-quality molded article and a multilayer body. That is, the polycarbonate resin composition is excellent in a plurality of properties among transparency, heat resistance, color tone, moldability, chemical resistance, moist heat resistance, and impact resistance in well balance. More specifically, it is excellent in transparency and heat resistance, and is also excellent in any one or more of moldability, chemical resistance, and moist heat resistance. Such a polycarbonate resin composition makes it possible to provide a molded article that is excellent in a plurality of properties among transparency, heat resistance, color tone, moldability, chemical resistance, moist heat resistance, and impact resistance in well balance. In addition, the polycarbonate resin composition makes it possible to provide a multilayer body that is excellent in mechanical properties, weather resistance, and optical properties and that can curtail warpage that occurs under use environment or storage environment.

BRIEF DESCRIPTION OF DRAWINGS

FIG. 1(a) is a sectional view of a multilayer body in which a resin layer A and a resin layer B are laminated one by one, FIG. 1(b) is a cross-sectional view of a multilayer body in which a resin layer A, a resin layer B, and a resin layer A are sequentially laminated in this order, FIG. 1(c) is a cross-sectional view of a multilayer body in which a resin layer A, a resin layer B, a resin layer A, and a resin layer B are sequentially laminated in this order, and FIG. 1(d) is a cross-sectional view of a multilayer body in which a resin layer A, a resin layer B, a resin layer B, and a resin layer A are sequentially laminated in this order.

MODES FOR CARRYING OUT THE INVENTION

Hereinafter, the present disclosure will be described in detail, but the present disclosure is not limited to the following description, and can be optionally modified and implemented without departing from the gist of the present disclosure. The present disclosure also includes various modified examples and modifications within an equivalent range. Further, in the present specification, when numerical values or physical property values are presented sandwiching "to" by placing the values before and after "to", the values before and after "to" are inclusive. Moreover, in a preferable range, more preferable range, and further preferable range of numerical values and physical property values, all combinations of the upper limit value and the lower limit value that determine these ranges can be selected. Therefore, a combination of the preferable upper limit value and the preferable lower limit value, a combination of the more preferable upper limit value and the more preferable lower limit value, and a combination of the further preferable upper limit value and the further preferable lower limit value are the most preferable, but these combinations are not necessarily restrictive.

In the present specification, a "repeating structural unit" means a structural unit which repeatedly appears in a resin, and a plurality of the structural units are connected to constitute the resin. For example, in the case of a polycarbonate resin, a portion including a carbonyl group is referred to as a repeating structural unit.

Further, the "structural unit" means a partial structure that constitutes the resin and is a specific partial structure included in the repeating structural unit. For example, it refers to a partial structure sandwiched between adjacent linking groups in the resin, or a partial structure sandwiched between a polymerizing reactive group present at a terminal portion of a polymer and a linking group adjacent to the polymerizable reactive group. More specifically, in the case of a polycarbonate resin, a carbonyl group is a linking group and a partial structure sandwiched between adjacent carbonyl groups is referred to as a structural unit.

[Polycarbonate Resin Composition]

A polycarbonate resin composition (hereinafter simply referred to as "resin composition in some cases") contains two or more types of polycarbonate resins each including a structural unit represented by the following formula (1). The structural unit represented by the following formula (1) is hereinafter referred to as a structural unit (a) in some cases. The resin composition contains at least a first polycarbonate resin and a second polycarbonate resin as a polycarbonate resin. The first polycarbonate resin and the second polycarbonate resin each contain the structural unit (a), but at least the content of the structural unit (a) constituting each resin is different. The first polycarbonate resin is a resin containing 40% by weight or more of the structural unit (a). The second polycarbonate resin is a resin containing less than 40% by weight of the structural unit (a). In some cases, the first polycarbonate resin is referred to as "resin A" as appropriate, and the second polycarbonate resin is referred to as "resin B" as appropriate.

[Chem. 7]

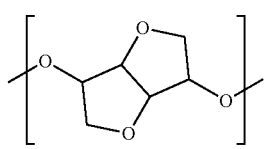

(7)

In the polycarbonate resin composition, the weight ratio of the first polycarbonate resin and the second polycarbonate resin (note, the first polycarbonate resin/second polycarbonate resin) is 55/45 to 99/1. When the weight ratio is within this range, the effects of moist heat resistance and chemical resistance can be obtained while maintaining practically sufficient heat resistance, mechanical properties, and moldability. From the viewpoint of further improving this effect, the weight ratio of the first polycarbonate resin to the second polycarbonate resin is preferably 60/40 to 98/2, more preferably 65/35 to 97/3, and further preferably 70/30 to 95/5.

The resin composition preferably further contains at least one of a polycarbonate resin and an acrylic resin as a third resin. The polycarbonate resin as the third resin is an aromatic polycarbonate resin containing 50% by weight or more of a structural unit represented by the following formula (3), and is hereinafter referred to as a "third polycarbonate resin" or "resin C1" as appropriate. The acrylic resin is an aromatic acrylic resin containing 50% by weight or more of a structural unit represented by the following formula (4), and is hereinafter referred to as a "resin C2" as appropriate. In addition, the resins C1 and C2 are collectively referred to as "resin C" as appropriate. In the formula (3), $R^1$ to $R^6$ are each independently a hydrogen atom or an alkyl group having 1 to carbon atoms which may have a substituent. In the formula (4), $R^7$ is a hydrogen atom or an alkyl group having 1 to 10 carbon atoms which may have a substituent. $R^8$ is an aryl group which may have a substituent or an aralkyl group which may have a substituent.

[Chem. 8]

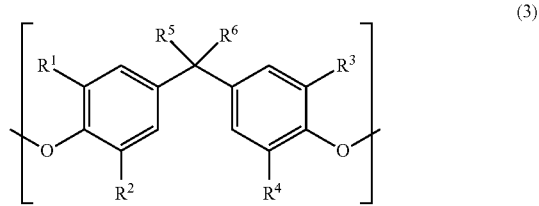

(3)

[Chem. 9]

(4)

When the polycarbonate resin composition contains the resin C, in the polycarbonate resin composition, with respect to 100 parts by weight of the total amount of the first polycarbonate resin, the second polycarbonate resin and the resin C, the content of the first polycarbonate resin is preferably 60 parts by weight or more, more preferably 65 parts by weight or more, and further preferably 70 parts by weight or more. The content of the first polycarbonate resin is preferably 95 parts by weight or less, more preferably 92 parts by weight or less, and further preferably 90 parts by weight or less. Further, the content of the second polycarbonate resin is preferably 3 parts by weight or more, more preferably 6.5 parts by weight or more, and further preferably 9 parts by weight or more. The content of the second polycarbonate resin is preferably 40 parts by weight or less, more preferably 35 parts by weight or less, and further preferably 30 parts by weight or less. The content of the resin C is preferably 0.01 parts by weight or more, more preferably 0.05 parts by weight or more, and further preferably 0.1 parts by weight or more. The content of the resin C is preferably 2 parts by weight or less, more preferably 1.5 parts by weight or less, and particularly preferably 1 part by weight or less. The content of the resin C is the total content of the resin C1 and the resin C2, and the content of either one of the resin C1 and the resin C2 may be zero.

Because the first polycarbonate resin is the main component of the polycarbonate resin composition and mainly contributes to heat resistance, the polycarbonate resin composition is excellent in heat resistance when the content is at least the lower limit of the above range. Meanwhile, when the content of the first polycarbonate resin is at most the upper limit of the above range, properties obtained by the second polycarbonate resin described later can be imparted.

The second polycarbonate resin mainly contributes to mechanical properties such as impact resistance, and thus the polycarbonate resin composition is excellent in mechanical properties when the content is at least the lower limit of the above range. Further, in a multilayer body, the second polycarbonate resin is mixed in order to obtain an effect of suppressing warpage of the multilayer body. On the other hand, the second polycarbonate resin has low heat resistance, and thus if the content exceeds the above range, the heat resistance may be impaired.

As will be described later, the first polycarbonate resin and the second polycarbonate resin are polycarbonate resins having a common structural unit and different composition ratios. Due to this, when these two types of resins are mixed, a phase separation structure is formed, but the two types of resins have partial compatibility and thus even without imparting a strong shearing force or high temperature to the resins during kneading, a component forming the domain structure in the resin composition can be finely dispersed in such a size that does not contribute to scattering of transmitted light. As a result, heat deterioration of the resins can be suppressed, and a resin composition having excellent transparency and color tone can be obtained. Furthermore, since the two resins are close in refractive index, good transparency is exhibited. Further, the second polycarbonate resin having excellent flexibility, toughness, and a relatively high molecular weight forms a domain in the resin composition, and this domain contributes to an improvement in moist heat resistance and chemical resistance when dispersed in the matrix composed of the first polycarbonate resin.

Note that the morphology such as a matrix-domain structure and compatibility of the resin composition can be examined by a conventional method, and specifically, it can be examined by observation with a transmission electron microscope.

The resin C includes a polycarbonate resin and/or an acrylic resin which have(has) an aromatic structure. The resin C is at least one of a polycarbonate resin and an acrylic resin having an aromatic structure. The resin C is incompatible with the first polycarbonate resin and compatible with the second polycarbonate resin. Therefore, by further mixing the resin C into the first polycarbonate resin and the second polycarbonate resin, the resin C dissolves into the phase of the second polycarbonate resin, and it becomes possible to adjust the refractive index of the phase of the second polycarbonate resin. The refractive indices of the first polycarbonate resin and the second polycarbonate resin are close to each other, but because the first polycarbonate resin and the second polycarbonate resin are different in temperature dependency of the refractive index, at high temperature, the resin composition may become cloudy to impair the transparency. By further adding the resin C to the resin composition, the refractive indices of the two phases can be made to exactly match, so that the transparency at high temperature can be improved. Further, the difference in transparency between high temperature and room temperature can be reduced.

When the content of the resin C is at least the lower limit of the above range, the effect of improving transparency is excellent. When it is at most the upper limit of the above range, the refractive indices of the phase of the resin A (that is, the first polycarbonate resin) and the phase of the resin B (that is, the second polycarbonate resin) do not become different from each other, so that the transparency is not impaired. That is, when it is at or below the above upper limit, the molded article of the resin composition can maintain high transparency at both room temperature and high temperature. On the other hand, since the resin C has an aromatic structure, if the content exceeds the upper limit, the weather resistance of the resin composition may be impaired.

Examples of the dihydroxy compound forming the structural unit of the above formula (1) (hereinafter referred to as "compound (1)") include isosorbide, isomannide, and isoidet, which are stereoisomeric. These may be used alone or in combination of two or more. Among them, isosorbide, which is abundant as a plant-derived resource and is obtained by dehydration condensation of sorbitol produced from various types of easily available starch, is most preferable from the viewpoint of obtainability and producibility, moldability, and properties of obtained molded articles (e.g., heat resistance, impact resistance, surface hardness, carbon neutral).

[First Polycarbonate Resin, Second Polycarbonate Resin]

The polycarbonate resin contains at least the first polycarbonate resin and the second polycarbonate resin described above, and can also contain polycarbonate resins other than the first polycarbonate resin and the second polycarbonate resin within a range not hindering the effects of the present disclosure. Specifically, for example, the third polycarbonate resin (that is, the resin C1) can be contained. Further, the polycarbonate resin in the polycarbonate resin composition may be substantially composed of the first polycarbonate resin and the second polycarbonate resin.

The weight ratio of the structural unit (a) in the first polycarbonate resin and that in the second polycarbonate resin are different from each other. The weight ratio of the structural unit (a) in the first polycarbonate resin means the weight ratio of the structural unit (a) with respect to the total weight of the first polycarbonate resin. The weight ratio of the structural unit (a) in the second polycarbonate resin means the weight ratio of the structural unit (a) with respect to the total weight of the second polycarbonate resin.

The first polycarbonate resin contains 40° by weight or more of the structural unit (a). The first polycarbonate resin may be a homopolymer substantially containing no structural unit other than the structural unit (a), or may be a copolymerized polycarbonate resin containing a structural unit other than the structural unit (a). The homopolymer of the structural unit (a) has high heat resistance, but has insufficient impact resistance and chemical resistance and is inferior in dimensional stability due to high water absorption. Therefore, the first polycarbonate resin is preferably a copolymerized polycarbonate resin containing the structural unit (a) and other structural unit(s), from the viewpoint of improving a balance of various physical properties for use as a molding material. The first polycarbonate resin is a component that contributes mainly to heat resistance, and thus the upper limit of the content of the structural unit (a) in the first polycarbonate resin is preferably 80% by weight, more preferably 70° by weight, further preferably 65° by weight, and particularly preferably 60% by weight. The lower limit of the content of the structural unit (a) is preferably 45° by weight, and more preferably 50° by weight. In the present specification, a structural unit other than the structural unit (a) constituting the polycarbonate resin is appropriately referred to as a "structural unit (b)". In the present specification, when numerical values of the upper limit and the lower limit are shown, it means that the range includes the numerical values. That is, it means that it is less than or equal to the upper limit value and greater than or equal to the lower limit value.

The second polycarbonate resin contains less than 40° by weight of the structural unit (a). The second polycarbonate resin contains the structural unit (a) similarly to the first polycarbonate resin, and thus the second polycarbonate resin easily exhibits compatibility with the first polycarbonate resin. The second polycarbonate resin preferably contains, for example, a larger amount of the structural unit (b) than that of the structural unit (a), or contains a larger amount of the structural unit (b) than that in the first polycarbonate resin while containing the structural unit (a) to the extent that compatibility with the first polycarbonate resin can be ensured. The second polycarbonate resin is a component contributory mainly to impact resistance, chemical resistance, and moist heat resistance, and thus the second polycarbonate resin preferably contains 35% by weight or less of the structural unit (a), and more preferably 30% by weight or less of the structural unit (a). Further, in order to ensure compatibility with the first polycarbonate resin, the lower limit of the content of the structural unit (a) in the second polycarbonate resin is usually 1% by weight, preferably 5% by weight, and more preferably 10% by weight.

At least one of the first polycarbonate resin and the second polycarbonate resin is preferably a copolymerized polycarbonate resin containing the structural unit (a) and the structural unit (b), and more preferably, both the first polycarbonate resin and the second polycarbonate resin are copolymerized polycarbonate resins containing the structural unit (a) and the structural unit (b). The structural unit (b) is suitably a structural unit derived from a dihydroxy compound other than the formula (1), but may be a structural unit derived from a compound other than dihydroxy compounds. Suitable examples of the dihydroxy compound forming the structural unit (b) include aliphatic hydrocarbon dihydroxy compounds, alicyclic hydrocarbon dihydroxy compounds, ether-containing dihydroxy compounds, and acetal-containing dihydroxy compounds. These dihydroxy compounds each have a flexible molecular structure. Therefore, the chemical resistance of the polycarbonate resin can be improved by using these dihydroxy compounds as raw materials for the polycarbonate resin.

Among the dihydroxy compounds, aliphatic hydrocarbon dihydroxy compounds and alicyclic hydrocarbon dihydroxy compounds are preferable, and alicyclic hydrocarbon dihydroxy compounds are most preferable, from the viewpoint of having a large effect of improving chemical resistance. Specific examples of the aliphatic hydrocarbon dihydroxy compounds, the alicyclic hydrocarbon dihydroxy compounds, the ether-containing dihydroxy compounds, and the acetal-containing dihydroxy compounds are as follows.

Examples of the aliphatic hydrocarbon dihydroxy compounds include the following dihydroxy compounds. Linear aliphatic dihydroxy compounds such as ethylene glycol, 1,3-propanediol, 1,2-propanediol, 1,4-butanediol, 1,5-heptanediol, 1,6-hexanediol, 1,9-nonanediol, 1,10-decane diol, and 1,12-dodecanediol; and aliphatic dihydroxy compounds having a branched chain such as 1,3-butanediol, 1,2-butanediol, neopentyl glycol, and hexylene glycol.

Examples of the alicyclic hydrocarbon dihydroxy compounds include the following dihydroxy compounds. Dihydroxy compounds that are alicyclic hydrocarbon primary alcohols, exemplified by 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalin dimethanol, 2,3-norbornane dimethanol, 2,5-norbornane dimethanol, 1,3-adamantane dimethanol, dihydroxy compounds derived from terpene compounds such as limonene, and the like; and dihydroxy compounds that are alicyclic hydrocarbon secondary alcohols or tertiary alcohols, exemplified by 1,2-cyclohexanediol, 1,4-cyclohexanediol, 1,3-adamantanediol, hydrogenated bisphenol A, 2,2,4,4-tetramethyl-1,3-cyclobutanediol, and the like.

Examples of the ether-containing dihydroxy compounds include oxyalkylene glycols. As the oxyalkylene glycols, for example, diethylene glycol, triethylene glycol, tetraethylene glycol, polyethylene glycol, polypropylene glycol, and the like can be used.

As the dihydroxy compound containing an acetal ring, for example, spiroglycol (alias: 3,9-bis(1,1-dimethyl-2-hydroxyethyl-2,4,8,10-tetraoxaspiro[5,5] undecane), dioxane glycol (alias: 2-(1,1-dimethyl-2-hydroxyethyl)-5-ethyl-5-hydroxymethyl-1,3-dioxane), and the like can be used.

As the dihydroxy compound forming the structural unit (b), among the dihydroxy compounds exemplified above, 1,4-cyclohexanedimethanol and tricyclodecanedimethanol are preferable and 1,4-cyclohexanedimethanol is particularly preferable. By using 1,4-cyclohexanedimethanol, the good polymerization reactivity of 1,4-cyclohexanedimethanol makes it easy to obtain a high-molecular weight polycarbonate resin, and it is possible to obtain a polycarbonate resin extremely excellent in mechanical properties such as impact resistance. For example, in a multilayer body, the effect of suppressing warpage by the second polycarbonate resin is more sufficiently exhibited. The structural unit (b) derived from 1,4-cyclohexane dimethanol is represented by the following formula (2). The second polycarbonate resin preferably contains 45° by weight or more of the structural unit represented by the formula (2). In this case, impact resistance and fluidity are more excellent. From the viewpoint of improving this effect, the second polycarbonate resin more preferably contains 50% by weight or more, further preferably 55% by weight or more of the structural unit represented by the formula (2).

[Chem. 10]

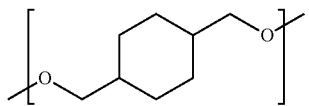

(2)

Tricyclodecane dimethanol is preferably used for the first polycarbonate resin. In this case, heat resistance and optical properties such as a low photoelastic coefficient required for optical films can be obtained.

The content ratio of the structural unit (b) in each of the first polycarbonate resin and the second polycarbonate resin is preferably 15° by weight or more, more preferably 20° by weight or more, preferably 85% by weight or less, and more preferably 80% by weight or less.

In the first polycarbonate resin, the content ratio of the structural unit (b) is preferably 20% by weight or more, more preferably 25° by weight or more, preferably 60% by weight or less, and more preferably 55% by weight or less. Within the above range, the balance of heat resistance, impact resistance, and chemical resistance is excellent.

In the second polycarbonate resin, the content ratio of the structural unit (b) is preferably 45° by weight or more, more preferably 50% by weight or more, particularly preferably 55% by weight or more, preferably 80° by weight or less, and more preferably 75% by weight. Within the above range, impact resistance, chemical resistance, and high fluidity, which are in a trade-off relationship with each other, are excellent at a high level and in a good balance.

The first polycarbonate resin and the second polycarbonate resin each may contain, as the structural unit (b), a structural unit other than the structural units derived from the compounds exemplified above. As other dihydroxy compounds forming such a structural unit, for example, dihydroxy compounds or diester compounds each containing an aromatic group, such as bisphenol compounds, can be used. A polycarbonate resin partially incorporating a structural unit derived from a diester compound is called a polyester carbonate resin. The polycarbonate resin shall include the polyester carbonate resin.

In some cases, the heat resistance of the polycarbonate resin can be improved by using a dihydroxy compound or a dicarboxylic acid compound containing an aromatic group such as a bisphenol compound as a copolymerization component. On the other hand, when the polycarbonate resin contains a large amount of structural units derived from a dihydroxy compound containing an aromatic group, the weather resistance tends to decrease. Further, there is a large difference in polymerization reactivity between the bisphenol compound or the dicarboxylic acid compound and another dihydroxy compound forming the structural unit (a) or the structural unit (b). Therefore, a bisphenol compound or a dicarboxylic acid compound remains as a terminal group, making it difficult to obtain a polycarbonate resin having a high molecular weight, so that the impact resistance tends to decrease. On the other hand, when the reaction temperature is increased to accelerate the reaction, the structural unit (a) is thermally decomposed, so that the obtained polycarbonate resin tends to be colored. For these reasons, the content of the structural unit derived from the aromatic group-containing dihydroxy compound or the dicarboxylic acid compound is preferably 10% by weight or less, and more preferably 5% by weight or less.

As the dihydroxy compound containing an aromatic group, for example, the following dihydroxy compounds can be used. Aromatic bisphenol compounds such as 2,2-bis(4-hydroxyphenyl)propane, 2,2-bis(3-methyl-4-hydroxyphenyl)propane, 2,2-bis(4-hydroxy-3,5-dimethylphenyl)propane, 2,2-bis(4-hydroxy-3,5-diethylphenyl)propane, 2,2-bis(4-hydroxy-(3-phenyl)phenyl)propane, 2,2-bis(4-hydroxy-(3,5-diphenyl)phenyl)propane, 2,2-bis(4-hydroxy-3,5-dibromophenyl)propane, bis(4-hydroxyphenyl)methane, 1,1-bis(4-hydroxyphenyl)ethane, 2,2-bis(4-hydroxyphenyl)butane, 2,2-bis(4-hydroxyphenyl)pentane, 1,1-bis(4-hydroxyphenyl)-1-phenylethane, bis(4-hydroxyphenyl)diphenylmethane, 1,1-bis(4-hydroxyphenyl)-2-ethylhexane, 1,1-bis(4-hydroxyphenyl)decane, bis(4-hydroxy-3-nitrophenyl)methane, 3,3-bis(4-hydroxyphenyl)pentane, 1,3-bis(2-(4-hydroxyphenyl)-2-propyl)benzene, 1,3-bis(2-(4-hydroxyphenyl)-2-propyl)benzene, 2,2-bis(4- hydroxyphenyl)hexafluoropropane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, bis(4-hydroxy-3-methylphenyl)sulfide, bis(4-hydroxyphenyl) disulfide, 4,4'-dihydroxydiphenyl ether, and 4,4'-dihydroxy-3,3'-dichlorodiphenyl ether; dihydroxy compounds having an ether group bonded to an aromatic group such as 2,2-bis (4-(2-hydroxyethoxy)phenyl)propane, 2,2-bis(4-(2-hydroxypropoxy)phenyl)propane, 1,3-bis(2-hydroxyethoxy) benzene, 4,4'-bis(2-hydroxyethoxy)biphenyl, and bis(4-(2-hydroxyethoxy)phenyl)sulfone; and dihydroxy compounds having a fluorene ring such as 9,9-bis(4-(2-hydroxyethoxy) phenyl)fluorene, 9,9-bis(4-hydroxyphenyl)fluorene, 9,9-bis (4-hydroxy-3-methylphenyl)fluorene, 9,9-bis(4-(2-hydroxypropoxy)phenyl)fluorene, 9,9-bis(4-(2-hydroxyethoxy)-3-methylphenyl)fluorene, 9,9-bis(4-(2-hydroxypropoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene.

Examples of the diester compounds include the following dicarboxylic acids. Aromatic dicarboxylic acids such as terephthalic acid, phthalic acid, isophthalic acid, 4,4'-diphenyldicarboxylic acid, 4,4'-diphenyletherdicarboxylic acid, 4,4'-benzophenonedicarboxylic acid, 4,4'-diphenoxyethanedicarboxylic acid, 4,4'-diphenylsulfone dicarboxylic acid, and 2,6-naphthalenedicarboxylic acid; alicyclic dicarboxylic acids such as 1,2-cyclohexanedicarboxylic acid, 1,3-cyclohexanedicarboxylic acid, and 1,4-cyclohexanedicarboxylic acid; and aliphatic dicarboxylic acids such as malonic acid, succinic acid, glutaric acid, adipic acid, pimelic acid, suberic acid, azelaic acid, and sebacic acid. Note that these dicarboxylic acid components each can be used for the raw material of the polyester carbonate resin as the dicarboxylic acid itself, but depending on the production method, a dicarboxylic acid ester which is a methyl ester body, a phenyl ester body, or the like, or a dicarboxylic acid derivative such as a dicarboxylic acid halide can also be used as the raw material.

The dihydroxy compound used as a raw material for the polycarbonate resin may contain a reducing agent, an antioxidant, an oxygen absorber, a light stabilizer, an antacid, and a stabilizer such as a pH stabilizer or a heat stabilizer. In particular, since the compound (1) has a property of easily degrading in an acidic condition, it is possible to suppress the degeneration of the compound (1) by using a basic stabilizer in the production process of the polycarbonate resin. This can improve the quality of the obtained polycarbonate resin composition.

As a diester carbonate used as a raw material for the polycarbonate resin, a compound represented by the following formula (5) is usually exemplified. These diester carbonates may be used alone or in combination of two or more.

[Chem. 11]

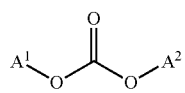

(5)

In the formula (5), $A^1$ and $A^2$ are each independently a substituted or unsubstituted aliphatic hydrocarbon group or a substituted or unsubstituted aromatic hydrocarbon group, having 1 to 18 carbon atoms. $A^1$ and $A^2$ may be the same or different. $A^1$ and $A^2$ are preferably substituted or unsubstituted aromatic hydrocarbon groups, and more preferably unsubstituted aromatic hydrocarbon groups.

As the diester carbonate represented by the formula (5), for example, a substituted diphenyl carbonate such as diphenyl carbonate (DPC) and ditolyl carbonate; and an alkyl carbonate such as dimethyl carbonate, diethyl carbonate, and di-tert-butyl carbonate can be used. Among these diester carbonates, diphenyl carbonate or substituted diphenyl carbonate is preferably used, and diphenyl carbonate is particularly preferably used.

The diester carbonate may contain impurities such as a chloride ion. The impurities contained may hinder the polycondensation reaction or may deteriorate the color tone of the obtained polycarbonate resin. Therefore, it is preferable to use the diester carbonate after purifying it by distillation or the like, as needed.

[Method for Producing First Polycarbonate Resin and Second Polycarbonate Resin]

The first polycarbonate resin and the second polycarbonate resin can be synthesized by polycondensing the dihydroxy compound and diester carbonate described above by a transesterification reaction. More specifically, they can be obtained by removing a monohydroxy compound and the like, which are by-products in the transesterification reaction, out of the system, in addition to polycondensation.

The transesterification reaction proceeds in the presence of a transesterification reaction catalyst (hereinafter, the transesterification reaction catalyst is referred to as a "polymerization catalyst"). The type of polymerization catalyst can greatly affect the reaction rate of the transesterification reaction and the quality of the obtained polycarbonate resin.

The polymerization catalyst is not particularly limited as long as it can satisfy the transparency, color tone, heat resistance, weather resistance, and mechanical strength of the obtained polycarbonate resin. As the polymerization catalyst, for example, a metal compound of Group I or Group II in the long-form periodic table (hereinafter simply referred to as "Group 1" or "Group 2"), and a basic compound such as a basic boron compound, a basic phosphorus compound, a basic ammonium compound, or an amine compound can be used, and among them, a Group 1 metal compound and/or a Group 2 metal compound is preferable.

Examples of the Group 1 metal compound include the following compounds. Sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium borophenylate, potassium borophenylate, lithium borophenylate, cesium borophenylate, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenylphosphate, dipotassium phenylphosphate, dilithium phenylphosphate, dicesium phenylphosphate, alcoholate and phenolate of sodium, potassium, lithium, and cesium, disodium salt, dipotassium salt, dilithium salts, and dicesium salts of bisphenol A, and the like. As the Group 1 metal compound, a lithium compound is preferable from the viewpoint of polymerization activity and the color tone of the obtained polycarbonate resin.

Examples of the Group 2 metal compound include the following compounds. Calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, and the like. The Group 2 metal compound is preferably a magnesium compound, a calcium compound, or a barium compound, further preferably a magnesium compound and/or a calcium compound, and most preferably a calcium compound, from the viewpoint of polymerization activity and the color tone of the obtained polycarbonate resin.

Note that although a basic compound such as a basic boron compound, a basic phosphorus compound, a basic ammonium compound, or an amine compound together may be supplementarily used together with the Group 1 metal compound and/or the Group 2 metal compound, it is further preferable to use only the Group 1 metal compound and/or the Group 2 metal compound. From the viewpoint of the color tone of the obtained polycarbonate resin, it is most preferable to use only the Group 2 metal compound.

As the basic phosphorus compound, for example, the following compounds can be adopted. Triethylphosphine, tri-n-propylphosphine, triisopropylphosphine, tri-n-butylphosphine, triphenylphosphine, tributylphosphine, quaternary phosphonium salts, and the like.

As the basic ammonium compound, for example, the following compounds can be adopted. Tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, butyltriphenylammonium hydroxide, and the like.

As the amine compound, for example, the following compounds can be adopted. 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, aminoquinoline, guanidine, and the like.

The use amount of the polymerization catalyst is preferably 0.1 μmol or more, further preferably 0.3 μmol or more, and particularly preferably 0.5 μmol or more, per 1 mol of all dihydroxy compounds used in the reaction. Further, the use amount of the polymerization catalyst is preferably 300 μmol or less, further preferably 100 μmol or less, and particularly preferably 50 μmol or less, per 1 mol of all dihydroxy compounds used in the reaction.

By adjusting the amount of the polymerization catalyst to be used in the above range, the polymerization rate can be increased, so that a polycarbonate resin having a desired molecular weight can be obtained without necessarily increasing the polymerization temperature, and thus the deterioration of the color tone of the polycarbonate resin can be suppressed. Further, the unreacted raw material can be prevented from volatilizing during the polymerization which affects the molar ratio of the dihydroxy compound to the diester carbonate, and thus it is possible to more reliably obtain a resin having a desired molecular weight and a copolymerization ratio. Furthermore, it is possible to suppress the occurrence of side reactions, and thus it is possible to further prevent deterioration of the color tone of the polycarbonate resin or coloring during molding.

Among the Group 1 metals, considering the adverse effect of sodium, potassium, and cesium on the color tone of the polycarbonate resin as well as the adverse effect of iron on the color tone of the polycarbonate resin, the total content of sodium, potassium, cesium, and iron in the polycarbonate resin (A) is preferably 1 ppm by weight or less. In this case, the deterioration of the color tone of the polycarbonate resin can be further prevented, and the color tone of the polycarbonate resin can be further improved. From the same viewpoint, the total content of sodium, potassium, cesium, and iron in the polycarbonate resin is more preferably 0.5 ppm by weight or less. Note that these metals may be mixed not only from the catalyst used but also from the raw materials and a reactor. Regardless of the source, the total amount of these metal compounds in the polycarbonate resin is preferably in the above range as the total content of sodium, potassium, cesium, and iron.

The dihydroxy compound and diester carbonate as raw materials are preferably melted individually or uniformly mixed before the transesterification reaction. The melting or mixing temperature is usually 80° C. or higher, preferably 90° C. or higher, and usually 200° C. or lower, preferably 150° C. or lower, particularly preferably 120° C. or lower. In this case, the dissolution rate can be increased and the solubility can be sufficiently improved, and problems such as solidification can be sufficiently avoided. Further, in this case, the thermal deterioration of the dihydroxy compound can be sufficiently suppressed, and the quality represented by the color tone of the obtained polycarbonate resin can be further improved.

The operation of melting or mixing the raw material dihydroxy compound and diester carbonate is preferably performed in an atmosphere in which the oxygen concentration is 10 vol % or less, further 0.0001 vol % or more and 10 vol % or less, above all, 0.0001 vol % or more and 5 vol % or less, particularly 0.0001 vol % or more and 1 vol % or less. In this case, the color tone can be improved and the reactivity can be enhanced.

The method for polycondensing a dihydroxy compound and a diester carbonate is carried out in multiple stages in the presence of the above-mentioned catalyst using a plurality of reactors. The reaction type may be a batch type, a continuous type, or a combination of a batch type and a continuous type, and it is preferable to adopt the continuous type which can obtain a polycarbonate resin with less heat history and is excellent in productivity.

From the viewpoint of controlling the polymerization rate and of the quality of the obtained polycarbonate resin, it is important to appropriately select a jacket temperature and an internal temperature, and a pressure in the reaction system depending on the reaction stage. Specifically, it is preferable to obtain a prepolymer at a relatively low temperature and low vacuum in the initial stage of the polycondensation reaction, and to increase a molecular weight to a predetermined value at a relatively high temperature and high vacuum in the latter stage of the reaction. In this case, it is easy to suppress the distillation of the unreacted monomer and to adjust the molar ratio of the dihydroxy compound and the diester carbonate to a desired ratio. As a result, a decrease in polymerization rate can be suppressed. Further, it becomes possible to more reliably obtain a polymer having a desired molecular weight or a terminal group.

The polymerization catalyst may be added to a raw material preparation tank or a raw material storage tank, or may be added directly to a polymerization reactor. From the viewpoint of stability of supply and of control of polycondensation reaction, it is preferable to install a catalyst supply line in the middle of the raw material line before the raw material is supplied to the polymerization reactor and supply the polymerization catalyst with an aqueous solution.

By adjusting the temperature of the polycondensation reaction, it is possible to improve productivity and avoid an increase in heat history of the product. Furthermore, it is possible to further prevent volatilization of the monomer and decomposition and coloring of the polycarbonate resin. Specifically, the following conditions can be adopted as the reaction conditions in the first-stage reaction. That is, the highest internal temperature of the polymerization reactor is usually set in the range of 160 to 230° C., preferably 170 to 220° C., and further preferably 180 to 210° C. The pressure in the polymerization reactor (hereinafter, pressure means absolute pressure) is usually set in the range of 1 to 110 kPa, preferably 5 to 50 kPa, and further preferably 7 to 30 kPa. The reaction time is usually set in the range of 0.1 to 10 hours, and preferably 1 to 5 hours. The first-stage reaction is preferably carried out while distilling the generated monohydroxy compound out of the reaction system.

From the second and subsequent stages, the pressure of the reaction system is gradually reduced from the pressure of the first stage, and while the monohydroxy compound that is continuously generated is removed out of the reaction system, the pressure of the reaction system (absolute pressure) is preferably finally set to 1 kPa or less. The highest internal temperature of the polymerization reactor is usually set in the range of 200 to 260° C., preferably 210 to 240° C., and particularly preferably 215 to 230° C. The reaction time is usually set in the range of 0.1 to 10 hours, preferably 0.5 to 5 hours, and particularly preferably 1 to 3 hours.

[Physical Properties of the First Polycarbonate Resin and the Second Polycarbonate Resin]

Glass Transition Temperature

The glass transition temperatures of the first polycarbonate resin and the second polycarbonate resin are preferably 40° C. or higher, and preferably 220° C. or lower. The glass transition temperature of the first polycarbonate resin is preferably 90° C. or higher, more preferably 100° C. or higher, further preferably 110° C. or higher, particularly preferably 120° C. or higher, and preferably 160° C. or lower, more preferably 150° C. or lower, and further preferably 140° C. or lower. Within the above range, sufficient heat resistance is achieved and the molding process becomes easy.

When used for a multilayer body, the glass transition temperatures of the first polycarbonate resin and the second polycarbonate resin is preferably 40° C. or higher, and preferably 180° C. or lower. The glass transition temperature of the first polycarbonate resin is preferably 100° C. or higher, more preferably 110° C. or higher, further preferably 120° C. or higher, and preferably 160° C. or lower, more preferably 150° C. or lower, and further preferably 140° C. or lower. Within the above range, sufficient heat resistance is achieved and the molding process becomes easy.

The glass transition temperature of the second polycarbonate resin is preferably 40° C. or higher, more preferably 50° C. or higher, further preferably 60° C. or higher, and preferably 110° C. or lower, more preferably 100° C. or lower, further preferably 90° C. or lower, and particularly preferably 80° C. or lower. Within the above range, reduction in heat resistance is suppressed, and impact strength, chemical resistance, moist heat resistance, fluidity, and the like are improved.

The difference in glass transition temperature between the first polycarbonate resin and the second polycarbonate resin is preferably 20° C. or higher, more preferably 30° C. or higher, and further preferably 40° C. or higher. The first polycarbonate resin and the second resin polycarbonate resin can be combined so as to have such a difference in glass transition temperature. In the multilayer body, the polycarbonate resin composition can make the direction of warpage of the first polycarbonate resin opposite to that of the second polycarbonate resin by having a difference in glass transition temperature of the first polycarbonate resin and the second polycarbonate resin. Due to this, the warpage of the multilayer body can be reduced by adjusting the mixing ratio of the first polycarbonate resin and the second polycarbonate resin.

Molecular Weight

The molecular weights of the first polycarbonate resin and the second polycarbonate resin can be represented by a reduced viscosity and a number average molecular weight measured by $^1$H-NMR. Values obtained by these measuring methods indicate that the higher the value, the higher the molecular weight. The reduced viscosities of the first polycarbonate resin and the second polycarbonate resin are usually 0.30 dL/g or more, and preferably 0.35 dL/g or more. In this case, the mechanical strength of the molded article can be further improved. On the other hand, the reduced viscosity is usually 1.00 dL/g or less, preferably 0.90 dL/g or less, and more preferably 0.80 dL/g or less. In this case, the fluidity at the time of molding can be improved, so that the productivity and moldability can be further improved. Details of the method for measuring the reduced viscosity will be described in Examples.

The reduced viscosity of the first polycarbonate resin is preferably 0.35 dL/g or more, more preferably 0.38 dL/g or more, further preferably 0.40 dL/g or more, and preferably 0.80 dL/g or less, more preferably 0.70 dL/g or less, and further preferably 0.65 dL/g or less. Within the above range, the mechanical strength of the molded article can be further improved.

The reduced viscosity of the second polycarbonate resin is preferably 0.60 dL/g or more, more preferably 0.65 dL/g or more, further preferably 0.70 dL/g or more, and preferably 1.00 dL/g or less, more preferably 0.90 dL/g or less, and further preferably 0.80 dL/g or less. Within the above range, the impact strength of the molded article is improved, and occurrence of cracks in a moist heat environment, a chemical resistance test, and the like can be suppressed. On the other hand, from the viewpoint of improving the fluidity while maintaining the strength of the molded article, the reduced viscosity of the second polycarbonate resin is preferably 0.30 dL/g or more, more preferably 0.35 dL/g or more, and preferably 0.60 dL/g or less, more preferably 0.55 dL/g or less, and further preferably 0.50 dL/g or less.

The number average molecular weights of the first polycarbonate resin and the second polycarbonate resin measured by $^1$H-NMR are usually 6000 or more, preferably 8000 or more, and usually 30000 or less, preferably 25000 or less, and more preferably 20000 or less. The number average molecular weights of the first polycarbonate resin and the second polycarbonate resin can be determined by measuring ¹H-NMR using deuterated chloroform as a solvent and analyzing the obtained spectra. Details of the measurement method will be described in Examples.

The number average molecular weight of the first polycarbonate resin is preferably 7,000 or more, more preferably 8,000 or more, further preferably 9000 or more, preferably 18,000 or less, more preferably 17,000 or less, and further preferably 16,000 or less.

The number average molecular weight of the second polycarbonate resin is preferably 17,000 or more, more preferably 17500 or more, further preferably 18,000 or more, and preferably 50,000 or less, more preferably 40,000 or less, and further preferably 30,000 or less. Within the above range, impact resistance, chemical resistance, and moist heat resistance are improved while good fluidity is maintained. On the other hand, from the viewpoint of imparting high fluidity without impairing impact resistance, the number average molecular weight of the second polycarbonate resin is preferably 6000 or more, more preferably 7000 or more, further preferably 8000 or more, and preferably 12000 or less, and more preferably 11000 or less.

Melt Viscosity

The melt viscosities of the first polycarbonate resin and the second polycarbonate resin are preferably 50 Pa·s or more and 3000 Pa·s or less. In this case, the molded article of the resin composition can be prevented from becoming brittle, and the mechanical properties can be further improved. Further, in this case, it is possible to improve the fluidity during molding and prevent the appearance of the molded article from being impaired and the dimensional accuracy from being deteriorated. Further, in this case, it is possible to further prevent coloring and foaming caused by the rise of the resin temperature due to the heat generated by shearing. When the resin composition is used for the multilayer body, from the same viewpoint, the melt viscosities of the first polycarbonate resin and the second polycarbonate resin are preferably 50 Pa·s or more and 5000 Pa·s or less. In the present specification, the melt viscosity means a melt viscosity at a temperature of 220° C. and a shear rate of 91.2 sec⁻¹, which is measured using a capillary rheometer (manufactured by Toyo Seiki Co., Ltd.). Details of the method for measuring the melt viscosity will be described in Examples below.

The melt viscosity of the first polycarbonate resin is preferably 1800 Pa·s or more, more preferably 2000 Pa·s or more, further preferably 2200 Pa·s or more, and preferably 3000 Pa·s or less, and more preferably 2800 Pa·s or less. Within the above range, the mechanical properties of the molded article will be good. When using the resin composition in the multilayer body, from the same viewpoint, the melt viscosity of the first polycarbonate resin is preferably 1800 Pa·s or more, more preferably 2000 Pas or more, and further preferably 2200 Pa·s or more. Further, it is preferably 4500 Pa·s or less, and more preferably 4000 Pa·s or less.

The melt viscosity of the second polycarbonate resin is preferably 1800 Pa·s or more, more preferably 2000 Pa·s or more, further preferably 2200 Pa·s or more, and preferably 3000 Pa·s or less, and more preferably 2800 Pa·s or less. Within the above range, impact resistance, excellent chemical resistance, and moist heat resistance can be obtained while fluidity during molding is secured. On the other hand, from the viewpoint of achieving a significant improvement in the fluidity during molding while securing the impact resistance, the melt viscosity of the second polycarbonate resin is 80 Pa·s or more, more preferably 90 Pa·s or more, further preferably 100 Pa·s or more, and preferably 500 Pa·s or less, more preferably 450 Pa·s or less, and further preferably 300 Pa·s or less.

[Resin C]

Resin C is a third polycarbonate resin containing 50° by weight or more of a structural unit represented by the following formula (3) (resin C1), and/or an acrylic resin containing 50% by weight or more of a structural unit represented by the following formula (4) (resin C2). These may be used alone or in combination of two or more. Hereinafter, the structural unit represented by the following formula (3) may be referred to as a structural unit (c), and the structural unit represented by the following formula (4) may be referred to as a structural unit (d).

[Chem. 12]

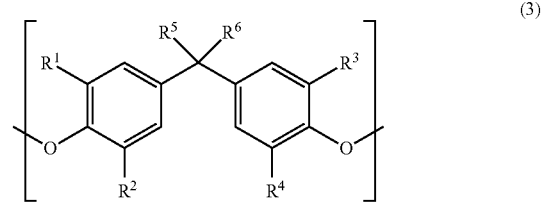

(3)

In the formula (3), R¹ to R⁶ are each independently a hydrogen atom or an alkyl group having 1 to 10 carbon atoms which may have a substituent.

[Chem. 13]

(4)

In the formula (4), R⁷ is a hydrogen atom or an alkyl group having 1 to 10 carbon atoms which may have a substituent. R⁸ is an aryl group which may have a substituent or an aralkyl group which may have a substituent.

The resin C is preferably compatible with the second polycarbonate resin. From the viewpoint of compatibility, in the structural unit represented by the formula (3), R¹ to R⁶ in the formula (3) each are preferably a hydrogen group or a methyl group. That is, as the dihydroxy compound forming the structural unit represented by the formula (3), 2,2-bis(4-hydroxyphenyl)propane, 2,2-bis(3-methyl-4-hydroxyphenyl)propane, 2,2-bis(4-hydroxy-3,5-dimethylphenyl)propane, 2,2-bis(4-hydroxyphenyl)methane, 2,2-bis(4-hydroxyphenyl)ethane, and the like are preferable. Among these, 2,2-bis(4-hydroxyphenyl)propane and 2,2-bis(3-methyl-4-hydroxyphenyl)propane are more preferable, and 2,2-bis(4-hydroxyphenyl)propane is particularly preferable.

The resin C1 may be a homopolymer substantially containing no structural unit other than the structural unit (c), or may be a copolymerized polycarbonate resin containing a structural unit other than the structural unit (c). From the viewpoint of compatibility between the resin C1 and the second polycarbonate resin, the content of the structural unit (c) in the resin C1 is preferably 50% by weight or more, more preferably 70% by weight or more, and further preferably 85% by weight or more.

As the structural unit other than the structural unit (c), the above structural unit (a) or structural unit (b) can be used. From the viewpoint of thermal stability and refractive index, the above-mentioned aromatic bisphenol compound is preferable among the structural units (b).

From the viewpoint of compatibility between the second polycarbonate resin and the resin C2, as the structural unit (d), $R^1$ is preferably a hydrogen atom or a methyl group, and $R^8$ is preferably a phenyl group or a benzyl group. That is, as the vinyl compound forming the structural unit (d), phenyl acrylate, phenyl methacrylate, benzyl acrylate, and benzyl methacrylate are preferable. Among these, phenyl acrylate and phenyl methacrylate are preferable, and phenyl methacrylate is particularly preferable.

The resin C2 may be a homopolymer substantially containing no structural unit other than the structural unit (d), or may be a copolymerized acrylic resin containing a structural unit other than the structural unit (d). From the viewpoint of compatibility between the resin C2 and the second polycarbonate resin, the content of the structural unit (d) in the resin C2 is preferably 50% by weight or more, more preferably 70° by weight or more, and further preferably 90% by weight or more.

As the vinyl compound forming a structural unit other than the structural unit (d), methyl acrylate, ethyl acrylate, n-butyl acrylate, tert-butyl acrylate, methyl methacrylate, ethyl methacrylate, n-butyl methacrylate, tert-butyl methacrylate, acrylonitrile, styrene, α-methylstyrene, butadiene, and the like can be used. Among these, methyl acrylate and n-butyl acrylate are preferable from the viewpoint of improving thermal stability and mechanical properties.

The resin C may be a polycarbonate resin (resin C1) containing the structural unit (c) or may be an acrylic resin (resin C2) containing the structural unit (d), and the two resins may be used at the same time in any ratio. From the viewpoint of improving the accuracy of adjusting the refractive index of the resin composition, it is preferable to use either one of the resin C1 and the resin C2.

[Physical Properties of Resin C]

In the resin composition of the present disclosure, the resin C plays a role of adjusting the refractive index of the phase including the second polycarbonate resin. In order not to impair the original properties of the second polycarbonate resin, the addition amount of the third resin (that is, the resin C) is preferably smaller, and from this viewpoint, the refractive index of the third resin is preferably 1.54 or more and 1.65 or less. The lower limit of the refractive index of the third resin is more preferably 1.55, and further preferably 1.56. The upper limit is more preferably 1.63, and further preferably 1.60. When the refractive index is within the above range, the addition amount of the third resin can be suppressed to the minimum necessary, and the mixing ratio of the third resin in the resin components can be easily controlled.

[Method for Producing Resin C]

The resin C may be a commercially available product or may be produced by a known method.

The resin composition may contain other components such as an additive in addition to the first polycarbonate resin, the second carbonate resin, and the resin C.

[Additive]

The polycarbonate resin may contain a catalyst deactivator. The catalyst deactivator is not particularly limited as long as it is an acidic substance and has a deactivating function of the polymerization catalyst. Above all, a phosphorus-based acidic compound is excellent in the effect of deactivating the catalyst and suppressing coloration, a phosphonic acid (phosphorous acid) and a phosphonic acid ester are further preferable, and phosphonic acid (phosphorous acid) is particularly preferable.

By adjusting the content of the phosphorus-based acidic compound depending on the amount of the polymerization catalyst, it is possible to more reliably obtain the effects of catalyst deactivation and color suppression. The content of the phosphorus-based acidic compound is preferably 0.5 times mol or more, more preferably 0.7 times mol or more, and further preferably 0.8 times or more, as the amount of phosphorus atom with respect to 1 mol of the metal atom of the polymerization catalyst. Further, the content is preferably 5 times mol or less, more preferably 3 times mol or less, and further preferably 1.5 times mol or less.

Examples of other additives include antioxidants, heat stabilizers, light stabilizers, ultraviolet absorbers, filling agents such as fillers, neutralizing agents, lubricants, anti-fogging agents, antiblocking agents, slip agents, dispersants, and coloring agents, flame retardants, antistatic agents, conductivity-imparting agents, cross-linking agents, cross-linking aids, metal deactivators, molecular weight regulators, fungicides, mildew-proofing agents, optical brighteners, light diffusing agents such as organic diffusing agents and inorganic diffusing agents, and the like, and these additives can be used within a range that does not impair the effects of the present disclosure.

Further, within a range that does not impair the effects of the present disclosure, for example, one or more types selected from synthetic resins such as aromatic polyester, aliphatic polyester, polyamide, polystyrene, polyolefin, amorphous polyolefin, acrylonitrile-butadiene-styrene copolymer (ABS resin), and acrylonitrile-styrene copolymer (AS resin); elastomers such as acrylic rubber and butadiene rubber; biodegradable resins such as polylactic acid and polybutylene succinate; and the like, and the above polycarbonate resin can be kneaded together. That is, the polycarbonate resin composition may be a polymer alloy.

[Method for Producing Resin Composition]

The resin composition can be produced, for example, by a method of mechanically melt-kneading the above-mentioned components constituting the resin composition. As a melt-kneader, a single-screw extruder, a twin-screw extruder, a Brabender, a Banbury mixer, a kneader blender, a roll mill, or the like can be used. At the time of kneading, the respective components may be kneaded at once, or a multi-stage divided kneading method may be used in which after kneading optionally some components, the other remaining components are added thereto and kneaded. Above all, a method of continuously charging each component and continuously obtaining a resin composition using a twin-screw extruder equipped with a vacuum vent is preferable from the viewpoint of productivity and quality uniformity. The kneading temperature is usually 150° C. or higher, preferably 180° C. or higher, and more preferably 200° C. or higher. The kneading temperature is usually 280° C. or lower, preferably 260° C. or lower, and more preferably 250° C. or lower. Within such a range, thermal deterioration of the resin during kneading can be suppressed, and coloring and deterioration of mechanical properties can be suppressed.

[Method for Analyzing Resin Composition]

Whether the resin composition is a mixture of a plurality of polycarbonate resins having different copolymerization ratios, that is, whether it contains the above-mentioned first polycarbonate resin and second polycarbonate resin can be confirmed by, for example, analysis with gradient polymer elution chromatography (GPEC) (see JP 2014-208800 A).

[Physical Properties of Polycarbonate Resin Composition]

Glass Transition Temperature

The resin composition preferably has two or more peaks of glass transition temperature measured by solid viscoelasticity. The fact that two or more glass transition temperatures are detected indicates that the resin composition is in the form of phase separation. The glass transition temperature on the low temperature side is preferably 40° C. or higher, more preferably 50° C. or higher, further preferably 60° C. or higher, and preferably 100° C. or lower, more preferably 90° C. or lower, and further preferably 80° C. or lower. Within the above range, impact resistance and fluidity are more excellent. When the resin composition is used in a multilayer body, if the glass transition temperature on the low temperature side is within the above range, mechanical properties such as impact resistance are further improved, and warpage of the multilayer body is further suppressed.

The glass transition temperature on the high temperature side is preferably 100° C. or higher, more preferably 110° C. or higher, further preferably 120° C. or higher, particularly preferably 130° C. or higher, and preferably 200° C. or lower, more preferably 190° C. or lower, further preferably 180° C. or lower, and particularly preferably 160° C. or lower. Within the above range, the molding temperature is further suppressed and the heat resistance is more excellent. Further, when the resin composition is used for a multilayer body, the glass transition temperature on the high temperature side is preferably 100° C. or higher, more preferably 110° C. or higher, further preferably 120° C. or higher, and preferably 160° C. or less, more preferably 150° C. or less, and further preferably 140° C. or less. Within the above range, heat resistance practically required can be obtained, and mechanical properties and moldability can be satisfied at a higher level.

Melt Viscosity

The melt viscosity of the resin composition is preferably 500 Pa·s or more and 4000 Pa·s or less. In this case, the molded article of the resin composition has sufficient mechanical properties and also has good moldability. From the viewpoint of further enhancement of this effect, the melt viscosity is more preferably 700 Pa·s or more, and further preferably 1000 Pa·s or more. Further, the melt viscosity is more preferably 3500 Pa·s or less, and further preferably 3000 Pa·s or less. In particular, when the resin composition is used for the multilayer body, it is particularly effective to adjust the melt viscosity within the above range.

Heat Deflection Temperature (HDT)

The heat deflection temperature of the resin composition is preferably 85° C. or higher and 120° C. or lower. In this case, the molded article of the resin composition has sufficient mechanical properties, and at the same time, the heat resistance practically required can be secured. From the viewpoint of further enhancement of this effect, the heat deflection temperature is more preferably 90° C. or higher, and further preferably 92° C. or higher. The heat deflection temperature is more preferably 115° C. or lower, and further preferably 110° C. or lower.

Impact Strength

The impact strength of the resin composition can be evaluated by, for example, a notched Charpy impact strength test described in Examples. The notched Charpy impact strength having a notch tip radius R of 0.25 mm is preferably 7 kJ/m$^2$ or more, more preferably 9 kJ/m$^2$ or more, further preferably 10 kJ/m$^2$ or more, and particularly preferably 11 kJ/m$^2$ or more. When the impact strength is within the above range, the resin composition has more excellent impact strength.

Total Light Transmittance, Haze

The total light transmittance and haze in the resin composition can be evaluated by, for example, a measurement method described in detail in Examples. The value of total light transmittance is preferably 85% or more, and more preferably 90% or more. Within the above range, the molded article has more excellent transparency, and thus the molded article is suitably used for optical members such as display front plates and for transparent electric/electronic member applications. From the same viewpoint, the value of total light transmittance is preferably 85% or more, and more preferably 90% or more at both temperatures of 25° C. and 90° C. The haze value is preferably 15% or less, more preferably 7% or less, and further preferably 5% or less at both temperatures of 25° C. and 90° C. Further, when the resin composition is used for a multilayer body, the haze value is preferably 5% or less, and more preferably 3% or less.

Color Tone

The color tone of the resin composition can be evaluated by, for example, a method of measuring a yellowness index (YI) described in detail in Examples. The yellowness index (YI) is preferably 5.0 or less. In this case, since a molded article of the resin composition has more excellent transparency, the molded article is suitably used for optical members such as a display front plate and for transparent electric/electronic member applications. From the viewpoint of further improving the transparency, the yellowness index is more preferably 3.0 or less, further preferably 2.5 or less, and particularly preferably 2.0 or less.

Chemical Resistance

The chemical resistance of the resin composition can be evaluated by, for example, a critical strain measured by a ¼ ellipse method described in detail in Examples. The critical strain value is preferably 0.3% or more, and more preferably 0.4% or more. When the critical strain value is within this range, the composition has more excellent chemical resistance, and thus is suitable for use in applications requiring chemical resistance such as automobile interior/exterior members.

Moist Heat Resistance

The moist heat resistance of the resin composition can be evaluated, for example, by the number of crack generation cycles in a moist-heat cycle crack test described in Examples. The number of crack generation cycles is preferably 20 or more, and more preferably 30 or more. Within the above range, the composition has more excellent moist heat resistance, and thus is suitably used for applications such as automobile interior members which are expected to be used in a high temperature and high humidity environment.

Pencil Hardness

The pencil hardness (surface hardness) of the resin composition can be evaluated, for example, by a method detailed in Examples. The pencil hardness is preferably HB or higher, and more preferably F or higher. In this case, the molded article and multilayer body of the resin composition are suitably used for applications such as a display front plate and automobile interior/exterior where scratch resistance is required. Further, also when the molded article and the multilayer body are used for an optical film, it is possible to suppress scratches during transportation, so that there is an advantage that, for example, the number of protective films is reduced. When higher surface hardness is required, it is possible to further apply a hard coat to the surface of the molded article or multilayer body of the resin composition.

Photoelastic Coefficient

The photoelastic coefficient of the resin composition can be evaluated by, for example, a method described in detail in Examples. When the resin composition is used, for example, for the multilayer body the absolute value of the photoelastic coefficient of the resin composition is preferably $25 \times 10^{-12}$ $Pa^{-1}$ or less. In this case, when the multilayer body is used as a polarizing plate member, birefringence generated by stress due to laminating or bending can be sufficiently reduced. In particular, the multilayer body can be suitably used as an optical film for use in a large-sized display or a flexible (bendable, rollable, foldable) display. From the viewpoint of further reducing the birefringence, the absolute value of the photoelastic coefficient is more preferably $20 \times 10^{-12}$ $Pa^{-1}$ or less, and further preferably $15 \times 10^{-12}$ $Pa^{-1}$ or less.

Surface Impact Resistance

The surface impact resistance of the resin composition can be evaluated by, for example, a DuPont impact test described in detail in Examples. When the resin composition is used, for example, for the multilayer body, the surface impact resistance preferably reachs ductile fracture under test conditions described in Examples. When such properties are obtained, the multilayer body can be suitably used for applications requiring impact resistance such as display front plates, building materials, and design films for automobile interior members, and applications for punching.

Weather Resistance

The weather resistance of the resin composition can be evaluated by, for example, a test using a xenon weather meter described in detail in Examples. The smaller the difference in color tone (YI) of a plate test piece between before and after the test, the less the coloration due to UV irradiation and the better the weather resistance. The absolute value ($\Delta YI$) of the difference in YI between before and after treatment under the test conditions described later is preferably 0.5 or less, further preferably 0.3 or less, and particularly preferably 0.1 or less. Within this range, the resin composition is suitably used for applications requiring weather resistance such as building materials used outdoors, front plates such as digital signage, and automobile interior/exterior members. In particular, when the resin composition is used, for example, for the multilayer body $\Delta YI$ is preferably in the above range.

[Reasons for Obtained Effects]

The reasons why the above-mentioned resin composition makes it possible to produce high-quality molded articles are presumed as follows. In a resin composition having two or more glass transition temperatures, two or more types of resins form a phase separation structure such as a matrix-domain structure. When a component with a low glass transition temperature and a high molecular weight is a domain structure, strain generated when water absorption expansion and drying contraction are repeated and strain generated by chemical swelling are absorbed at the matrix-domain interface, and strength is increased due to the high molecular weight component, so that the occurrence of cracks can be prevented. On the other hand, when a component with a low glass transition temperature and a low molecular weight is a domain structure, the component forming the domain structure has sufficient mechanical strength and high fluidity, so that the fluidity can be improved without impairing the mechanical strength. Also, when two types of resins with different glass transition temperatures are compatible, one glass transition temperature appears in the middle of the two types depending on compositions of both the components, and heat resistance decreases, but when the two types are incompatible, the chemical resistance, moist heat resistance, and fluidity can be improved without lowering the heat resistance of the component having the higher glass transition temperature. Furthermore, since the first polycarbonate resin and the second polycarbonate resin component that constitute the resin composition each contain the same structural unit, the two components are partially compatible. This makes it possible to finely disperse the domains into such a size that does not contribute to scattering of transmitted light without applying a strong shearing force or high temperature during kneading. As a result, heat deterioration of the resins can be suppressed, and a resin composition having excellent transparency and color tone can be obtained. Note that the morphology such as a matrix-domain structure and compatibility of the resin composition can be examined by a conventional method, and specifically, it can be examined by observation with a transmission electron microscope.

[Method for Producing Molded Article]

The resin composition can be processed into various articles by, for example, an injection molding (insert molding method, two-color molding method, sandwich molding method, gas injection molding method, etc.), an extrusion molding method, an inflation molding method, a T die film molding method, a multilayer body molding method, a blow molding method, a hollow molding method, a compression molding method, and a calender molding method. The shape of the molded article is not particularly limited, and examples thereof include a sheet, a film, a plate, a particle, an agglomerate, a fiber, a rod, a porous body, and a foam, and the sheet, film, and plate are preferable. Further, the molded film can be uniaxially or biaxially stretched. Examples of the stretching method include a roll method, a tenter method, and a tubular method. Further, surface treatments such as corona discharge treatment, flame treatment, plasma treatment, and ozone treatment which are usually used industrially can be performed. The molded article may be generally called a molded body.

[Use]

The use of the molded article is not particularly limited, but the following uses can be given as an example. Specifically, the examples thereof include electric wires, cords, coating materials for wire harnesses, insulating sheets, displays and touch panels for OA equipment, membrane switches, photo covers, relay parts, coil bobbins, IC sockets, fuse cases, camera pressure plates, FDD collets, floppy hubs, optical disc substrates in the field of optical components, optical disc pickup lenses, optical lenses, LCD substrates, PDP substrates, TV screens for projection televisions, retardation films, fog lamp lenses, illumination switch lenses, sensor switch lenses, Fresnel lenses, protective glasses, projection lenses, camera lenses, sunglasses, light guide plates, camera strobe reflectors, and LED reflectors in the electric/electronic parts field; headlamp lenses, turn signal lamp lenses, tail lamp lenses, resin window glass, meter covers, outer plates, door handles, rear panels, wheel caps, visors, roof rails, sunroofs, instrument panels, panels, control cable coatings, airbag covers, mudguards, bumpers, boots, air hoses, lamp packings, gaskets, various malls such as window malls, site shields, weather strips, glass run channels, grommets, and vibration control and sound insulation materials in automobile parts; jointing materials, handrails, windows, table edge materials, sashes, bathtubs, window frames, signs, lighting covers, water tanks, stair wainscots, carports, high speed road sound insulation walls, multi-wall sheets, steel wire coverings, lighting gloves, switch breakers, protective covers for machine tools, industrial deep-draw vacuum forming containers, and pump housings in the field of construction materials; various packings, grips, belt, foot rubber, rollers, protectors, suckers, gaskets for refrigerators, switches, connector covers, game machine covers, windows of pachinko machines, OA housings, notebook PC housings, HDD head trays, and instrument, transparent housings, rollers with gears for OA, switch case sliders, gas cock knobs, clock frames, gear trains of clocks, amber caps, and various rolls for OA equipment in the field of home appliances and light electric appliances; tubular molded articles such as hoses and tubes; profile-extruded articles; leather-like products; occlusal tools; toys such as soft touch dolls; general sundry articles such as pen grips, straps, suction cups, watches, umbrella bones, cosmetic cases, and toothbrush grips; containers such as houseware and Tupperware; zip ties; various bottles such as infusion bottles by blow molding, food bottles, water bottles, and bottles for personal care such as cosmetics; catheters, syringes, syringe gaskets, drip tubes, tubes, ports, caps, rubber stoppers, dialyzer, blood connectors, dentures, and disposable containers in medical parts; and the like, and the molded article is also applicable to uses by foam molding.

Among the above, particularly for tubes, the molded article is suitable for a medical tube capable of preventing adsorption of a medicinal component, and in a case of a multilayer tube, the molded article is most suitable for an inner layer material or an intermediate layer material.

The use of the molded article in the film/sheet field is not particularly limited, but the following uses can be given as an example. That is, the examples include packaging stretch film, commercial or household wrap film, pallet stretch film, stretch label, shrink film, shrink label, sealant film, retort film, retort sealant film, aroma retaining heat seal film, sealant for A-PET, frozen food container/lid, cap seal, heat-welding film, heat-bonding film, heat-sealing film, sealant film for bag-in-box, retort pouch, standing pouch, spout pouch, laminated tube, heavy-duty sack, and fiber wrapping film in the field of packing of food and sundries; film for house and multi film in the field of agricultural film; infusion bag, multi-chamber vessel such as high calorie infusion, peritoneal dialysis (CAPD), and antibiotic kit bag, drainage bag for peritoneal dialysis, blood bag, urine bag, surgery bag, ice pillow, ampoule case, and PTP packaging in the medical film and sheet fields; civil water impermeable sheet, waterproofing material, mat, joint material, floor materials, roofing, decorative films, skin films, and wallpaper in the building material related fields; leather, ceiling materials, trunk room linings, interior skin materials, vibration control sheets, and sound insulation sheets in the automotive parts fields; display covers, battery cases, mouse pads, mobile phone cases, IC card cases, floppy disk cases, and CD-ROM cases in the light electric appliance field; toothbrush cases, puff cases, cosmetic cases, medicinal cases such as eye drop cases, tissue cases, and face pack cases in the toiletry and sanitary field; film and sheets for stationary, clear files, pen cases, notebook covers, desk mats, keyboard covers, book covers, and binders in the office supplies related fields; furniture leather, toys such as beach balls, rain gear such as umbrellas and rain coats, table cloths, blister package, bath lid, towel case, fancy case, tag case, pouch, amulet bag, insurance card cover, passbook case, passport case, and knife case in the field of sundries for general household; retroreflective sheet; synthetic paper; and the like. Further, as a pressure-sensitive adhesive composition, or in the field of film/sheet in which a pressure-sensitive adhesive material is applied to a substrate to impart tackiness, a carrier tape, a pressure-sensitive adhesive tape, a marking film, a semiconductor or glass dicing film, a surface protective film, steel sheet/plywood protective film, automobile protective film, packaging/bundling adhesive tape, office/household adhesive tape, bonding adhesive tape, paint masking adhesive tape, surface protective adhesive tape, sealing adhesive tape, anticorrosion/waterproofing adhesive tape, electrical insulating adhesive tape, electronic device adhesive tape, adhesive film, adhesive film for medical/sanitary materials such as adhesive plaster base film, identification/decorative adhesive tape, display tape, packaging tape, surgical tape, adhesive tapes for labels, and the like are exemplified.

The molded article preferably includes an automobile interior part or an automobile exterior part. That is, the usage of the molded article is preferably an automobile interior part or an automobile exterior part. In this case, the above-mentioned effects of the resin composition can be fully utilized. From the same viewpoint, the molded article is preferably used for an on-vehicle display, a car navigation, a car audio, a console panel, a dashboard, or a door trim article. That is, the usage of the molded article is preferably an on-vehicle display, a car navigation, a car audio, a console panel, a dashboard, or a door trim article. Specifically, it can be used for a display front plate or a housing of an on-vehicle display, a car navigation, or a car audio.

[Multilayer Body]

For example, in Patent Documents 5 to 8 described above, in many cases, a film made of an ISB-based polycarbonate resin and a film made of another resin are bonded directly or via an adhesive or a pressure-sensitive adhesive to be used as a multilayer body. However, since the dimensional change rate of each resin layer due to heat and water absorption varies depending on the type of resin, such a multilayer body may warp under use environment or storage environment. In particular, the ISB-based polycarbonate resin has a relatively high water absorption rate due to the molecular structure of ISB and a large dimensional change rate due to water absorption, and thus warpage is easily generated when laminated with a film made of another resin. In order to improve the warpage of the multilayer body, for example, the film made of the resin A and the film made of the resin B are made to have a symmetrical structure of two types and three layers (A/B/A) to match up the dimensional change rates of the front and back, thereby suppressing the warpage. However, such a method has a problem that the multilayer body becomes thick, so that it cannot be applied to use in which a thinner member is required, and that an extra layer is provided, resulting in an increase in cost. On the other hand, the multilayer body having the resin layer A containing the resin composition can solve such a problem. That is, without impairing the excellent properties such as mechanical strength, weather resistance, and optical properties of the ISB-based polycarbonate resin, it is possible to ensure the degree of freedom of configuration of the multilayer body and provide the multilayer body with suppressed warpage. The ISB-based polycarbonate resin means a polycarbonate resin obtained by using ISB, and specifically means a polycarbonate resin having the structural unit (a).

Hereinafter, the structure of the multilayer body will be described with reference to FIG. 1, but the multilayer body in the present disclosure is not limited to examples of FIGS. 1(a) to 1(d). As illustrated in FIGS. 1(a) to 1(d), a multilayer body 1 has a resin layer A11 containing the resin composition and a resin layer B12. The resin layer B12 is made of a resin different from that of the resin layer A11. The multilayer body 1 has one or more resin layers A11 and one or more resin layers B12. That is, the multilayer body 1 has at least one resin layer A11 and at least one resin layer B12. The arrangement pattern (that is, the layered pattern) of the resin layer A11 and the resin layer B12 in the multilayer body 1 and the number of layers can be appropriately changed.

The structure of the multilayer body 1 is not particularly limited as long as it has one or more resin layers A11 containing the polycarbonate resin composition and one or more resin layers B containing another resin different from the polycarbonate resin composition. For example, as illustrated in FIG. 1(b), the resin layer A11 can be layered on both surfaces of the resin layer B12. In this case, the resin layer A11, the resin layer B12, and the resin layer A11 are layered in this order, and two types of resin layers (that is, the resin layer A11 and the resin layer B12) are layered in three layers. Such a layered structure can be expressed as resin layer A/resin layer B/resin layer A. In the multilayer body 1 as described above, the thickness and material of each resin layer forming the multilayer body can have a symmetrical structure across an imaginary center line $L_c$ that bisects the thickness of the multilayer body. In this case, the multilayer body 1 is less likely to be warped or twisted.

On the other hand, the layer structure of the multilayer body may be asymmetric. For example, as illustrated in FIG. 1(a) and FIG. 1(c), in the cross section in the layered direction of the multilayer body 1, at least one of material and thickness in the layered structure of the resin layer A11 and the resin layer B12 can be asymmetric across an imaginary center line $L_c$ that bisects the thickness of the multilayer body. In FIG. 1(a) and FIG. 1(c), the layered structure is asymmetric in at least the material. In FIG. 1(a), the multilayer body 1 is a multilayer body in which one resin layer A11 and one resin layer B12 are layered, and the layered structure is represented as resin layer A/resin layer B. In FIG. 1(c), the multilayer body 1 is a multilayer body in which two resin layers A11 and two resin layers B12 are layered, and a resin layer A11, a resin layer B12, a resin layer A11, and a resin layer B12 are sequentially layered. The layered structure is represented as resin layer A/resin layer B/resin layer A/resin layer B. In the multilayer body 1, since the resin layer A includes the specific polycarbonate resin composition described above, it is possible to suppress the warpage of the multilayer body 1 even if the layer structure is not a symmetrical structure but an asymmetric structure. That is, since the property of the polycarbonate resin composition of the multilayer body A11 that the dimensional change rate due to water absorption is small is sufficiently utilized, even if the multilayer body 1 has an asymmetric structure, the warpage of the multilayer body 1 is suppressed. Therefore, from the viewpoint of increasing the merit of using the polycarbonate resin composition, the layer structure of the multilayer body 1 is preferably asymmetrical. For example, in order to make the multilayer body 1 have a symmetrical structure, for example, it is not necessary to provide an extra layer separately. That is, the degree of freedom of the layered structure of the multilayer body is increased. Note that, in FIGS. 1(a) and 1(c), the resin layers 11 and 12 forming the multilayer body 1 are illustrated as being asymmetric in material, but the thickness can be asymmetric.

FIG. 1(d) illustrates a multilayer body 1 in which two resin layers A11 and two resin layers B12 are layered, and a resin layer A11, a resin layer B12, a resin layer B12, and a resin layer A11 are sequentially layered. The layered structure is represented as resin layer A/resin layer B/resin layer B/resin layer A. When the two resin layers B are made of the same material, the multilayer body 1 has a symmetrical structure at least in the material. On the other hand, when the two resin layers B are made of different resins, the multilayer body 1 has an asymmetric structure at least in the material.

The resin layers forming the multilayer body may be caused to mutually adhere to each other by an adhesive or a pressure-sensitive adhesive, or the resin layers may be caused to directly adhere to each other by, for example, fusion bonding.

The material of the resin layer B is not particularly limited as long as it is different from the material of the resin layer A. For example, the resin layer B is preferably a thermoplastic resin from the viewpoint of increasing the degree of freedom in molding such as, for example, co-extrusion to form a multilayer body or co-stretching of a multilayer body to produce a stretched film. The resin layer B is made of, for example, at least one selected from the group consisting of polycarbonate resin, polyester resin, acrylic resin, styrene resin, polyolefin, and cycloolefin polymer. These are appropriately selected depending on the use of the multilayer body. The following are examples of use that takes advantage of the properties of each resin.

When a polycarbonate resin is used for the resin layer B, by using the resin layer A on the surface side, the resin layer B, which is inferior in scratch resistance and weather resistance, can be protected by the resin layer A while utilizing the high impact resistance of the resin layer B.

When a polyester resin or polyolefin is used for the resin layer B, the resin layer B may be used as a protective film. Before forming the resin layer A into a film and winding it on a roll, by laminating the resin layer B, it is possible to prevent the resin layer A from being scratched during storage or transportation, or it is possible to improve peelability and slippage when it is unwound from the roll and used.

When an acrylic resin is used for the resin layer B, by using an acrylic resin having excellent surface hardness on the surface layer side, it is possible to impart higher surface hardness in addition to the original properties of the resin layer A.

When a polystyrene resin is used for the resin layer B, the resin layer A exhibits positive birefringence by stretching, and the resin layer B exhibits negative birefringence by stretching, and thus by strictly controlling each phase difference, it is possible to produce a high-performance retardation film such as a broadband quarter-wave plate.

When a cycloolefin polymer is used for the resin layer B, by using the resin layer A having excellent chemical resistance on the surface side, it is possible to produce a film that compensates for the weakness in chemical resistance of the resin layer B.

The method for producing the resin for use in the resin layer B is not particularly limited, and a known method may be used, or a commercially available product may be used.

The total thickness of the multilayer body can be appropriately adjusted in response to the requirements of the use. From the viewpoint of sufficiently exhibiting the above-mentioned excellent effects of the polycarbonate resin composition, the total thickness of the multilayer body is preferably in the range of 10 μm or more and 500 μm or less. In this range, the warpage caused by the dimensional change of the multilayer body cannot be suppressed by the rigidity of the multilayer body itself, and thus the warpage cannot be suppressed unless the dimensional change of the material itself constituting the multilayer body is suppressed. Therefore, the property of a small dimensional change rate exhibited by the resin composition is more sufficiently exhibited. From the viewpoint of further improving this effect, the total thickness of the multilayer body is more preferably 20 μm or more, and further preferably 30 μm or more. From the same viewpoint, the total thickness is more preferably 300 μm or less, and further preferably 200 μm or less.

The required thickness of the resin layer A varies depending on the use, but is preferably in the range of 1 μm or more and 300 μm or less from the viewpoint of exhibiting the effects of the resin composition most effectively. From the same viewpoint, it is more preferably 5 μm or more, and further preferably 10 μm or more. Further, it is more preferably 200 μm or less, and further preferably 150 μm or less.

The required thickness of the resin layer B varies depending on the use, but is preferably in the range of 1 μm or more and 300 μm or less. It is more preferably 5 μm or more, and further preferably 10 μm or more. Further, it is more preferably 200 μm or less, and further preferably 150 μm or less. Within the above range, the characteristics of the resin used for the resin layer B can be sufficiently exhibited.

The thickness ratio between the resin layer A and the resin layer B in the multilayer body is preferably 0.02 to 50 in the resin layer B/the resin layer A. That is, the ratio of the thickness of the resin layer B to the thickness of the resin layer A is preferably 0.02 to 50.

Molded articles of the polycarbonate resin composition of the present disclosure have high surface hardness. For uses such as transparent building materials and small display windows of electric and electronic devices for which a particularly high surface hardness is not required, a molded article of the polycarbonate resin composition or the multilayer body of the resin layer A and the resin layer B can be used as it is for various purposes, for example, without being hard-coated. On the other hand, for uses such as display covers for mobile phones and touch panels where a particularly high scratch resistance is required, a hard-coat treatment can be applied to the surface of the molded article of the polycarbonate resin or the multilayer body having the resin layer A and the resin layer B. The hard coat layer may be formed on the surface of either the resin layer A or the resin layer B, but it is preferable to apply a hard coat to a layer of the polycarbonate resin composition of the present disclosure or acrylic resin having a high surface hardness.

The hard coat layer can be made of acrylic resin, urethane resin, melamine resin, organic silicate compound, silicone resin, metal oxide, or the like. From the viewpoint of excellent hardness and durability, the hard coat layer is preferably made of silicone resin or acrylic resin. From the viewpoint of not only excellent hardness and durability but also excellent curability, flexibility, and productivity, the hard coat layer is more preferably made of an acrylic resin, and is further preferably made of an active ray curable acrylic resin or a thermosetting acrylic resin.

Various additives may be further mixed into the hard coat layer, if necessary, within a range that does not impair the effects of the present disclosure. As the additive, for example, a stabilizer such as an antioxidant, a light stabilizer, and an ultraviolet absorber, a surfactant, a leveling agent, and an antistatic agent can be used.

In the case where warping or twisting occurs in the multilayer body as a result of performing the hard-coat treatment on only one side of the multilayer body, the warping or twisting can be suppressed by performing the hard-coat treatment on both sides of the multilayer body. For example, when the multilayer body has a front surface and a back surface, the front surface may be subjected to the hard-coat treatment, or the front surface and the back surface may be subjected to the hard-coat treatment. In this case, there is an advantage that the back side is less likely to be unintentionally scratched when the multilayer body is handled. The hard-coat treatment on the back side is preferably performed in the same manner as the hard-coat treatment on the front side.

The hard-coat treatment is roughly divided into two types, off-line coating and in-line coating. In the off-line coating, a coating material for forming a hard coat layer is applied to a base film (for example, the multilayer body). In the in-line coating, the coating material is applied in the film forming process of the base film (for example, the resin layer A and the resin layer B).

As a coating method of the coating material, for example, a reverse coating method, a gravure coating method, a rod coating method, a bar coating method, a die coating method, a spray coating method, or the like can be used.

The thickness of the hard coat layer may be determined depending on the use, but is usually preferably 0.1 to 30 μm, and more preferably 1 to 15 μm. When the thickness of the hard coat layer is less than 0.1 μm, the surface hardness is insufficient and scratches are likely to occur because it is too thin. On the other hand, when the thickness exceeds 30 μm, cracks are likely to be formed in the cured film due to stresses such as punching and bending, and workability may be impaired.

On the surface of the multilayer body, a decorative layer, an adhesive layer, an antireflection layer, an antifouling layer, and the like can be formed in addition to the hard coat layer, as long as the essence of the present disclosure is not impaired. In order to improve the adhesion between these layers and the multilayer body, the surface of the multilayer body can be pretreated. As the pretreatment, corona discharge treatment, UV treatment, application of anchor coating agent, or the like is used. As the anchor coating agent, for example, at least one resin selected from the group consisting of polyester resin, acrylic resin, acrylic modified polyester resin, polyurethane resin, polysiloxane, and epoxy resin is preferably used.

By providing the antireflection layer or the antifouling layer on the multilayer body, the multilayer body becomes suitable for a display cover of an image display device used particularly outdoors. In this case, visibility of an image can be further improved. As the antireflection layer and the antifouling layer, layers having the respective functions may be layered on the multilayer body, or a layer having both functions may be layered.

The antireflection layer is, for example, a layer that enhances an antireflection function and also enhances an abrasion resistance, an antistatic function, and a water repellency function. The antireflection layer can be provided by coating the multilayer body with a liquid containing a conventionally known material, for example, an inorganic substance (optical filler), a binder resin, an additive, and a solvent.

The antifouling layer is a layer that enhances an antifouling property. The antifouling layer can be formed using a conventionally known material such as a fluorine-based silane coupling agent.

The antireflection layer and the antifouling layer can be formed, for example, by coating the multilayer body in the same manner as the hard coat layer described above. If necessary, a known adhesive may be used to laminate a film-shaped or sheet-shaped antireflection agent and the antifouling layer to the multilayer body to be caused to adhere. When the antireflection layer and the antifouling layer are made of a thermoplastic resin, the antireflection layer or the antifouling layer can be provided on the surface of the multilayer body by coextruding the multilayer body and the antireflection layer or the antifouling layer.

A decorative layer can be formed on the multilayer body. As the decorative layer, for example, a printing layer or a vapor deposition layer can be formed. A colored resin layer formed on the base film may be used as the decorative layer.

The binder resin material for the printing layer is preferably polyurethane resin, vinyl resin, polyamide resin, polyester resin, acrylic resin, polyvinyl acetal resin, polyester urethane resin, cellulose ester resin, alkyd resin, thermoplastic elastomer resin, or the like. Among these, a resin that forms a flexible film is more preferable. It is preferable to add a coloring ink of a desired color to the binder resin. The coloring ink contains, for example, a pigment or a dye as a colorant.

Examples of the method for forming the printing layer include an offset printing method, a gravure printing method, a screen printing method, and the like. In particular, when multicolor printing or gradation color is required, the offset printing method or the gravure printing method is preferable. In the case of a single color, a gravure coating method, a roll coating method, a comma coating method, or the like can be adopted. Depending on the design, the printing layer may be formed on the entire surface of the multilayer body, or the printing layer may be partially formed on the multilayer body. The printing method can be appropriately changed depending on the printing area of the multilayer body.

As the material forming the vapor deposition layer, metals such as aluminum, silicon, zinc, magnesium, copper, chromium, and nickel chromium are preferable. Aluminum metal is more preferable in terms of designability and cost, but an alloy composed of two or more metal components may be used. These metal thin film layers can be formed on a multilayer body by vapor deposition. For vapor deposition, a vacuum vapor deposition method is usually used, but ion plating, sputtering, a method of activating an evaporated material with plasma, or the like may be used. A chemical vapor deposition method (CVD method) is also included in the vapor deposition method in a broad sense, and the CVD method may be used. The evaporation source for vapor deposition includes, but is not limited to, a resistance heating type board type, a crucible type by radiation or high frequency heating, an electron beam heating type, and the like.

In the method using a colored resin layer formed on the base film, the colored resin layer is formed on the base film. Examples of the forming method include, but are not limited to, a method of laminating a resin colored with a coloring agent by a coating method or an extrusion laminating method. As the colorant, for example, a dye, an organic pigment, or an inorganic pigment is used.

The multilayer body can be used as a molding sheet, and the molded body can be subjected to various secondary processes. For example, the molded body can be thermoformed. The thermoforming method is not particularly limited, and examples thereof include known molding methods such as blister molding, vacuum molding, and pressure molding.

[Physical Properties of Multilayer Body]
Warpage of Multilayer Body
The warpage in the multilayer body can be evaluated by, for example, the method described in detail in Examples. The absolute value of the warpage is preferably mm or less, and more preferably 3 mm or less. When the absolute value is the above upper limit or less, the multilayer body is suitably used for a front protective plate for a large display, a protective film for a polarizing plate, a retardation film, and the like, where warpage is likely to be a problem in an assembly process and a product use environment.

[Method for Producing Multilayer Body]
The resin composition can be formed into a sheet, a film, or a plate-shaped molded article by a molding method such as injection molding method, extrusion molding method, inflation molding method, T die film molding method, laminate molding method, blow molding method, hollow molding method, compression molding method, and calender molding method. The injection molding includes an insert molding method, two-color molding method, sandwich molding method, gas injection molding method, and the like. It is also possible to uniaxially or biaxially stretch the film. Examples of the stretching method include a roll method, a tenter method, and a tubular method. Further, surface treatment such as corona discharge treatment, flame treatment, plasma treatment, and ozone treatment, which is usually used industrially, can be applied to a sheet, a film, or a plate-shaped molded article.

The multilayer body can be produced by a conventionally known method. For example, a method in which layers are formed separately in advance and laminated or thermocompression-pressed, a method in which one film formed in advance is used as a base material, and the other layer is formed on one or both sides of the base material by coating, and a method in which resin layers constituting the multilayer body are laminated by a coextrusion method to form a film are exemplified.

The temperature setting of the extruder and the die used for forming the sheet of the polycarbonate resin composition is preferably 200° C. or higher and 280° C. or lower. In this case, thermal decomposition can be suppressed and a multilayer body having a good appearance can be obtained. From the viewpoint of further improving this effect, the temperature setting of the extruder and the die is more preferably 210° C. or higher, and further preferably 220° C. or higher. From the same viewpoint, the temperature setting of the extruder and the die is more preferably 260° C. or lower, and further preferably 250° C. or lower.

The multilayer body can also be stretched to be used. For the stretching, a known method such as longitudinal uniaxial stretching of carrying out stretching between rolls, lateral uniaxial stretching or oblique stretching using a tenter, or simultaneous biaxial stretching and sequential biaxial stretching in which the longitudinal uniaxial stretching, the lateral uniaxial stretching and oblique stretching are combined can be used, and the most suitable stretching method may be selected depending on the purpose. From the viewpoint of productivity, it is preferable to carry out stretching in a continuous system, but it is also possible to carry out stretching in a batch system, and there is no particular limitation on the selection of both.

[Uses of Multilayer Body]
The multilayer body has a plurality of properties such as impact resistance, transparency, weather resistance, optical properties such as low photoelastic coefficient, chemical resistance, and high surface hardness in good balance. The use in the film/sheet field is not particularly limited, but examples of uses in which the multilayer body can be particularly preferably used include building materials (resin windows, carport sheets, transparent sound insulation walls, sheets for resin-coated metal plate, etc.), automobile interior/exterior members (decorative film used for in-mold molding, sheets for vacuum/pneumatic molding and heat press molding, etc.), optical film/sheet (display front plate, polarizing plate protective film, retardation film, transparent substrate film, cover film, etc.), home electric appliance components (housings of smartphone and laptop computer), and office supplies related fields (sheets for plastic cards such as magnetic stripe cards and non-contact type IC cards).

EXAMPLES

Hereinafter, the present disclosure will be described in more detail with reference to Examples, but the present disclosure is not limited to the following Examples unless the gist thereof is exceeded.

[Measurement Method]

Various physical properties were measured according to the following methods.

Reduced Viscosity

The resin was dissolved in methylene chloride to prepare a resin solution having a concentration of 0.6 g/dL. Using an Ubbelohde viscometer tube manufactured by Moritomo Rika Kogyo Co., Ltd., solvent passage time to and solution passage time t were measured under a temperature condition of 20.0° C.±0.1° C. Using the obtained values of to and t, a relative viscosity $\eta_{rel}$ was determined by the following equation (i), and a specific viscosity $\eta_{sp}$ was determined by the following equation (ii) using the obtained relative viscosity $\eta_{rel}$.

$$\eta_{rel} = t/t_0 \tag{i}$$

$$\eta_{sp} = (\eta - \eta_0)/\eta_0 = \eta_{rel} - 1 \tag{ii}$$

Then, the obtained specific viscosity $\eta_{sp}$ was divided by the concentration c (g/dL) to determine a reduced viscosity $\eta_{sp}/c$. The higher this value, the higher the molecular weight.

Number Average Molecular Weight by $^1$H-NMR

About 20 mg of a polycarbonate resin sample was weighed and dissolved in about 0.7 mL of deuterated chloroform, the resulting solution was put into an NMR tube having an inner diameter of 5 mm to measure $^1$H-NMR spectrum. The number average molecular weight was calculated from the intensity ratio of the signal based on the structural unit derived from each dihydroxy compound constituting the polycarbonate resin and the signal of various terminal groups. The equipment and conditions used are as follows. Note that NMR means nuclear magnetic resonance.

Equipment: JNM-ECZ400S (manufactured by JEOL Ltd.)
Measurement temperature: 30° C.
Relaxation time: 6 seconds
Cumulated number: 64 times For example, $^1$H-NMR analysis of a copolymerized polycarbonate resin of ISB and CHDM is performed as follows. Note that the ISB double bond terminal and the CHDM double bond terminal are terminal group structures produced by a thermal decomposition reaction during the polymerization reaction.

[Range for Calculating Integral Value]

(a): 5.6 to 4.4 ppm: derived from all ISB repeating structural units (proton number: 4, molecular weight: 172.14)
(b): 2.2 to 0.5 ppm: derived from all CHDM repeating structural units (proton number: 10, molecular weight: 170.21)
(c): 4.4 ppm: derived from hydroxy terminal group of ISB (proton number: 1)
(d): 3.6 to 3.5 ppm: derived from ISB hydroxy terminal group (proton number: 1) and derived from CHDM hydroxy terminal group (proton number: 2)
(e): 3.5 to 3.4 ppm: derived from CHDM hydroxy terminal group (proton number: 2) and derived from ISB double bond terminal group (proton number: 1)
(f): 2.6 ppm: derived from ISB hydroxy terminal group (proton number: 1)
(g): 6.7 to 6.5 ppm: derived from ISB double bond terminal group (proton number: 1)
(h): 2.3 ppm: derived from CHDM double bond terminal group (proton number: 2)
(i): 7.4 ppm: derived from DPC terminal group (proton number: 2, molecular weight: 93.10)

[Calculation of Value Corresponding to the Number of Moles of Each Structure]

All ISB repeating structural units (a'): (a) integrated value/4
All CHDM repeating structural units (b'): (b) integrated value/10
ISB hydroxy terminal group (c'): (c) integrated value+(f) integrated value
CHDM hydroxy terminal group (d'): {(d) integrated value−(f) integrated value}/2+{(e) integrated value−(g) integrated value}/2
ISB double bond terminal group (e'): (g) integral value
CHDM double bond terminal group (f'): (h) integral value/2
DPC terminal group (i'): (i) integrated value/2

[Calculation of Number Average Molecular Weight]

$$\{(a') \times 172.14 + (b') \times 170.21 + (i') \times 93.10\} / [\{(c') + (d') + (e') + (f') + (i')\}/2]$$

Measurement Method of Glass Transition Temperature by Dynamic Viscoelasticity Measurement A pellet-shaped resin was vacuum-dried for 5 hours or longer at a temperature as high as possible within the range where the pellet was not fused. Then, the pellet was pressed at 10 MPa with a mini test press [manufactured by Toyo Seiki Co., Ltd.] set to 200° C., then pressed and cooled at 15 MPa with the mini test press set to 25° C. to produce a sheet with a thickness of 0.5 mm. Next, the sheet was cut into a width of 5 mm and a length of 20 mm to produce a sheet-shaped test piece. This test piece was measured with a dynamic mechanical analyzer [manufactured by TA Instruments, Inc.] under the conditions of frequency of 1 Hz, temperature rising rate of 2° C./min, and temperature of 30° C. to melting temperature, and the peak temperature of tan δ in the measurement results was used as the glass transition temperature.

Melt Viscosity

A pellet-shaped resin was vacuum-dried for 5 hours or longer at a temperature as high as possible within a range where the pellet was not fused. Then, the melt viscosity of the pellet was measured with a capillary rheometer (manufactured by Toyo Seiki Co., Ltd.). The measurement temperature was 220° C., and the shear rate was in the range of 9.12 to 1824 sec$^{-1}$. The value at the shear rate of 91.2 sec$^{-1}$ was used as the melt viscosity of the resin to be measured. Note that an orifice of 1 mmφ×10 mmL was used when the melt viscosity was 500 Pa·s or more, and an orifice of 1 mmφ×40 mmL was used when the melt viscosity was less than 500 Pa·s.

Refractive Index

Approximately 4 g of a resin pellet vacuum-dried at 90° C. for 5 hours or longer was preheated at a temperature of 200 to 230° C. for 3 minutes using a spacer of 14 cm in length, 14 cm in width, and 0.1 mm in thickness and laying a polyimide film on each of the top and bottom of the sample, pressurized for 5 minutes under a pressure of 30 MPa, taken out together with the spacer, and cooled to produce a film. A rectangular test piece having a length of 40 mm and a width of 8 mm was cut out from this film to obtain a measurement sample. The refractive index nD was measured by a multi-wavelength Abbe refractometer DR-M4/1550 manufactured by Atago Co., Ltd. using an interference filter of 589 nm (D line). The measurement was performed at 20° C. using monobromonaphthalene as an interface liquid.

Measurement of Total Light Transmittance and Haze

A pellet of the polycarbonate resin composition was dried at 90° C. for 4 hours or longer using a hot air dryer. The pellet used for the measurement is made of a polycarbonate resin composition produced in each of the Examples described below, on which coloring etc. has not been performed and which has a transparent appearance accordingly. The same applies to the subsequent measurement methods. Next, the pellet was supplied to a 75-ton injection molding machine (EC-75 manufactured by Toshiba Machine Co., Ltd.), and molding was performed under the conditions of a resin temperature of 240° C., a mold temperature of 60° C., and a molding cycle of 60 seconds to obtain an injection-molded plate (width 100 mm×length 100 mm×thickness 2 mm). According to JIS K7136 (2000), a haze meter NDH2000 (manufactured by Nippon Denshoku Industries Co., Ltd.) was used to measure the total light transmittance and haze of the injection-molded plate with a D65 light source. Difference depending on the difference of the temperatures is expressed as the difference obtained by subtracting the value at 25° C. from the value at 90° C. In each of Examples 1-1 to 1-10 and Comparative Examples 1-1 to 1-3, a total light transmittance of 90° or more was determined to be acceptable. Further, in each of Examples 2-1 to 2-8 and Comparative Examples 2-1 to 2-3, the injection-molded plate was adjusted to 25° C. and 90° C. before the measurement to perform the measurement at two temperatures. From the viewpoint of maintaining high transparency at both room temperature and high temperature, preferably, the total light transmittance is 90° or more and the haze is 15% or less at both temperatures of 25° C. and 90° C. Further, the difference between the total light transmittance at a temperature of 90° C. and the total light transmittance at a temperature of 25° C. (that is, ΔTrans) was calculated, and the difference between the haze at a temperature of 90° C. and the haze at a temperature of 25° C. (that is, ΔHaze) was calculated.

Yellowness (YI) Measurement

Using the injection-molded plate produced as described above (width 100 mm×length 100 mm×thickness 2 mm), in accordance with ASTM E313-96, the YI of the injection-molded plate was measured using a spectrophotometer CM-5 (manufactured by Konica Minolta, Inc.) with a C light source. In the present Examples, the YI value of 3.0 or less was determined to be acceptable.

Notched Charpy Impact Test

An ISO test piece for mechanical properties obtained below was subjected to a notched Charpy impact test in accordance with ISO179 (2000). As for the notch, measurement was performed for the tip radius R of 0.25 mm. Note that the greater the numerical value of the notched Charpy impact strength, the better the impact resistance strength, but when the tip radius R of the notch was 0.25 mm, in the present Examples, if the Charpy impact strength was 7 kJ/m$^2$ or more, the mechanical strength was determined to be practical, and if the Charpy impact strength was 10 kJ/m$^2$ or more, the mechanical strength was determined to be excellent.

Measurement Method of Flow Length by Spiral Flow

A pellet of the transparent polycarbonate resin composition was dried at 90° C. for 4 hours or longer using a hot air dryer. Next, the pellet was supplied to a 75-ton injection molding machine EC-75 (manufactured by Toshiba Machine Co., Ltd.), and using a spiral flow mold with a channel thickness of 2 mm and a channel width of 8 mm, a spiral injection-molded product was obtained by molding under conditions of a resin temperature of 240° C., an injection pressure of 100 MPa, a mold temperature of 60° C., an injection speed of 50 mm/s, an injection time of 10 seconds, and a cooling time of 10 seconds. The flow length was measured from this injection-molded product. This flow length due to the spiral flow is an index of the fluidity of the resin during molding. The higher the numerical value, the better the fluidity, and for example, the productivity of a molded article by injection molding can be improved, and molding of a more complicated shape or thin shape becomes possible.

Measurement Method of Heat Deflection Temperature (HDT)

A pellet of the polycarbonate resin composition was dried at 90° C. for 4 hours or longer using a hot air dryer. Next, the pellet was supplied to a 75-ton injection molding machine EC-75 (manufactured by Toshiba Machine Co., Ltd.) and molded under the conditions of a resin temperature of 240° C., a mold temperature of 60° C., and a molding cycle of 60 seconds to obtain an ISO test piece for mechanical properties. Next, a strip-shaped test piece having a length of 80 mm, a width of 10 mm, and a thickness of 4 mm was cut out from the ISO test piece. Then, using a heating deformation tester (manufactured by Toyo Seiki Co., Ltd.), in accordance with JIS K7191-1 (2007), the heat deflection temperature of the strip-shaped test piece was determined using the flatwise method at a bending stress of 1.8 MPa. In Examples 2-1 to 2-8 and Comparative Examples 2-1 to 2-3, when HDT was 85° C. or higher, the test piece was determined to have practical heat resistance, and when it was 90° C. or higher, it was determined to have excellent heat resistance.

MFR Measurement Method

A pellet of the polycarbonate resin composition was dried at 90° C. for 4 hours or longer using a hot air dryer. Next, a melt indexer (manufactured by Toyo Seiki Co., Ltd.) was used to measure the MFR of the pellet under the conditions of a temperature of 230° C. and a load of 2.16 kg in accordance with JIS K7210.

Moist Heat Resistance

Using injection-molded plates (width 100 mm×length 100 mm×thickness 2 mm) produced as described above, five injection-molded plates were placed in a constant temperature and humidity chamber ETAC HIFLEX FX410N (Kusumoto Chemicals, Ltd.), heated at a temperature of 65° C. and a humidity of 95° RH for 48 hours, and further heated at a temperature of 65° C. and a humidity of 25% RH for 8 hours. Then, these two heating steps were taken as one cycle, the number of cycles when cracks were generated in all the five injection-molded plates was measured, and the result was evaluated as an index of moist heat resistance. In Examples 1-1 to 1-10 and Comparative Examples 1-1 to 1-3, when the number of cycles when cracks were generated in all the five plates was 20 or more, it was determined that the moist heat resistance was excellent. In addition, if cracks did not occur in all the five plates even at the 35th cycle, the result was expressed as over-35 cycles (that is, ">35").

Chemical Resistance Test

A pellet of the polycarbonate resin composition was dried at 90° C. for 4 hours or longer using a hot air dryer. Next, the pellet was supplied to a 75-ton injection molding machine EC-75 (manufactured by Toshiba Machine Co., Ltd.), and molded under the conditions of a resin temperature of 240° C., a mold temperature of 60° C., and a molding cycle of 60 seconds to obtain an injection-molded plate (100 mm width×100 mm length×1 mm thickness). Next, the molded plate was pressed with a press molding machine (Mini test press manufactured by Toyo Seiki Co., Ltd.) at a temperature of 200° C. and a pressure of 5 MPa for 1 minute, and then pressed at a temperature of 25° C. and a pressure of MPa for 2 minutes to obtain a press-molded plate (width 100 mm×length 100 mm×thickness 1 mm). Then, the press-molded plate was cut into a width of 40 mm and a length of 100 mm to produce a test piece. Igepal CA-630 (manufactured by MP Biomedicals) was applied to the surface of this test piece, and the test piece was placed on a ¼ elliptical jig with a major axis of 120 mm and a minor axis of 60 mm and heated in an inert oven (DN4101 manufactured by Yamato Scientific, Co., Ltd.) set to 70° C. for 4 hours. Then, the distance between crack generation points in the test piece was measured, and the critical strain was determined by the following Equation (I).

[Math. 1]

$$\varepsilon = \frac{b}{2a^2}\left\{1 - \frac{(a^2 - b^2)X^2}{a^4}\right\}^{-\frac{3}{2}} \times t \times 100 \qquad (I)$$

In Equation (I), ε is the strain at the crack generation point (that is, critical strain) (%), a is the major axis length of the ¼ elliptical jig (mm), b is the minor axis length of the ¼ elliptical jig, t is the test piece thickness (mm), and X is the crack generation point (mm). In the present Examples, those having a critical strain of 0.3% or more were determined to have excellent chemical resistance.

Surface Impact Test

A press-molded sheet having a thickness of 0.5 mm was produced by the same method as "Measurement method of glass transition temperature by dynamic viscoelasticity measurement". Using this sheet as a test piece, a surface impact test was performed using a DuPont impact tester [manufactured by Toyo Seiki Seisaku-sho, Ltd.]. A weight was dropped on the test piece under the conditions of a test temperature of 25° C., a pedestal inner diameter of 30 mm, a pedestal outer diameter of 50 mm, a hammer core radius of ¼ inch, a weight of 800 g, and a height of 50 cm. The measurement was performed using ten test pieces, and when the ratio of ductile fracture was 80% or more, it was evaluated as "ductile", and other than that was evaluated as "brittle".

Photoelastic Coefficient

Using an apparatus in which a birefringence measuring device equipped with an He—Ne laser, a polarizer, a compensator, an analyzer, and a photodetector and a vibration type viscoelasticity measuring device (DVE-3 manufactured by Rheology Co., Ltd.) were combined, the measurement was performed (for details, see Journal of the Society of Rheology, Japan Vol. 19, p 93-97 (1991)). Press molding same as in "Measurement method of glass transition temperature by dynamic viscoelasticity measurement" was performed to produce a film having a thickness of 0.2 mm. A test piece having a width of 5 mm and a length of 20 mm was cut out from this film. The test piece was fixed to the viscoelasticity measuring device, and a storage elastic modulus E' was measured under the conditions of room temperature (specifically, 25° C.) and a frequency of 96 Hz. At the time of this measurement, the emitted laser light was caused to pass through the polarizer, the test piece, the compensator, and the analyzer in this order, and was detected by the photodetector (photodiode) to obtain a waveform having an angular frequency of ω or 2ω by a lock-in amplifier. The phase difference with respect to the amplitude and strain was determined, and a strain-optic coefficient O' was determined. At this time, the directions of the absorption axes of the polarizer and the analyzer were orthogonal to each other, and each were adjusted so as to make an angle of π/4 with respect to the extending direction of the test piece. The photoelastic coefficient C was obtained from the following equation (a) using the storage elastic modulus E' and the strain-optic coefficient O'.

$$C = O'/E' \qquad (\alpha)$$

Weather Resistance Test

First, an injection-molded plate having a thickness of 2 mm was produced by the same method as in the above-described measurement of total light transmittance and haze. Using a xenon weather meter [Atlas Weatherometer Ci4000 manufactured by Toyo Seiki Seisaku-sho, Ltd.], the injection-molded plate was irradiated with light from a light source under the conditions of an irradiation intensity of 60 W/m$^2$ and a black panel temperature of 65° C. Irradiation was carried out for 100 hours under a rain cycle condition of 12 minutes with rain/48 minutes without rain. The color tone of the injection-molded plate before and after irradiation was measured using a spectrocolorimeter CM-5 manufactured by Konica Minolta, Inc., in accordance with ASTM D1925. The injection-molded plate was placed in a measuring chamber, and the YI (yellowness index) value of the transmitted light was measured. The smaller the difference (ΔYI) between the YI after the irradiation treatment and the YI before the treatment, the less the coloring due to UV irradiation and the better the weather resistance.

Color Tone (YI)

First, an injection-molded plate having a thickness of 2 mm was produced by the same method as in the above-described measurement of total light transmittance and haze. The injection-molded plate was placed in a measuring chamber, and the YI (yellowness index) value of the transmitted light was measured.

Pencil Hardness

First, an injection-molded plate having a thickness of 2 mm was produced by the same method as in the above-described measurement of total light transmittance and haze. The pencil hardness of the injection-molded plate was measured by a method described in JIS K5600-5-4 using a pencil scratch coating hardness tester [manufactured by Toyo Seiki Seisaku-sho, Ltd.].

Evaluation of Warpage of Multilayer Body

A sample of the multilayer body composed of a film-shaped test piece made of a polycarbonate resin composition (test piece A) and a film-shaped test piece made of another resin (test piece B) was produced to evaluate warpage of the multilayer body sample. First, the polycarbonate resin composition was press-molded in the same manner as in the above-mentioned measurement method of glass transition temperature by dynamic viscoelasticity measurement to produce a film having a thickness of 0.2 mm. A strip-shaped test piece (test piece A) having a width of 20 mm and a length of 100 mm was cut out from the film. As a resin material to be combined with this test piece, BPA-PC, COP, and PMMA described later were used for evaluation. BPA-PC, COP, and PMMA were formed into a film by press molding. A test piece (test piece B) having a width of 20 mm, a length of 100 mm, and a thickness of 0.2 mm was cut out from each of the films made of BPA-PC, COP, and PMMA, respectively. The test piece A and the test piece B were laminated and pressurized in the layered direction using a hot press machine to produce a sample of multilayer body. This sample of multilayer body is a multilayer body of a layer of the test piece A corresponding to the resin layer A and a layer of the test piece B corresponding to the resin layer B. The pressurizing condition is as follows: a temperature of 110 to 160° C., a pressure of 1 MPa, and time of 5 minutes. The heating temperature was appropriately adjusted depending on the glass transition temperature of the material. Next, the multilayer body sample was immersed in warm water at 60° C. for 3 hours. Then, the multilayer body sample was placed on a horizontal table with the layer of the test piece A facing upward, and the magnitude of warpage was measured. When the multilayer body sample was warped and the center portion of the test piece A layer side is lifted, the lifted distance is the magnitude of the warpage. On the other hand, when the center portion of the test piece B layer side was lifted, the multilayer body sample was turned upside down and the lifted distance of the center portion was measured, and the distance was represented by a negative value. That is, the smaller the absolute value of the distance, the smaller the warpage of the multilayer body.

{Raw Materials Used}

Abbreviations and manufacturers of compounds used in the following Production Examples and Examples are as follows.

[Dihydroxy Compound]
ISB: Isosorbide (manufactured by Roquette Freres SA)
CHDM: 1,4-cyclohexanedimethanol (manufactured by SK Chemicals Co., Ltd.)
TCDDM: Tricyclodecane dimethanol (manufactured by OXEA Gmbh)

[Diester Carbonate]
DPC: Diphenyl carbonate (manufactured by Mitsubishi Chemical Corporation)

[Catalyst Deactivator]
Phosphonic acid (manufactured by Tokyo Chemical Industry Co., Ltd.)

[Heat Stabilizer (Antioxidant)]
Irganox 1010: Pentaerythritol-tetrakis(3-(3,5-di-tert-butyl-4-hydroxyphenyl)propionate] (manufactured by BASF)
AS2112: Tris(2,4-di-tert-butylphenyl)phosphite (manufactured by ADEKA Corporation)

[Release Agent]
E-275: Ethylene glycol distearate (manufactured by NOF Corporation)

[Uv Absorber]
SEESORB709: 2-(2-hydroxy-5-tert-octylphenyl)-2H-benzotriazole (manufactured by Shipro Kasei Kaisha, Ltd.)

[First Polycarbonate Resin; Resin A]
PC-A1: ISB/CHDM=70/30 mol % copolymerized polycarbonate (structural unit (a)/structural unit (b)=58.8/24.9% by weight)
It was synthesized as in Production Example 1 described later.

PC-A2: ISB/CHDM=50/50 mol % copolymerized polycarbonate (structural unit (a)/structural unit (b)=42.1/41.5% by weight)
It was synthesized as in Production Example 2 described later.

PC-A3: ISB/TCDDM=70/30 mol % copolymerized polycarbonate (structural unit (a)/structural unit (b)=53.9/31.1% by weight)
It was synthesized as in Production Example 3 described later.

[Second Polycarbonate Resin; Resin B]
PC-B1: ISB/CHDM=40/60 mol % copolymerized polycarbonate (structural unit (a)/structural unit (b)=33.7/49.9% by weight)
It was synthesized as in Production Example 4 described later.

PC-B2: ISB/CHDM=35/65 mol % copolymerized polycarbonate (structural unit (a)/structural unit (b)=29.5/54.1° by weight)
It was synthesized as in Production Example 5 described later.

PC-B3: ISB/CHDM=30/70 mol % copolymerized polycarbonate (structural unit (a)/structural unit (b)=25.3/58.3% by weight)
It was synthesized as in Production Example 6 described later.

PC-B4: ISB/CHDM=35/65 mol % copolymerized polycarbonate (structural unit (a)/structural unit (b)=29.5/54.1° by weight)
It was synthesized as in Production Example 7 described later.

PC-B5: ISB/CHDM=30/70 mol % copolymerized polycarbonate (structural unit (a)/structural unit (b)=25.3/58.3% by weight)
It was synthesized as in Production Example 8 described later.

PC-B6: ISB/CHDM=30/70 mol % copolymerized polycarbonate (structural unit (a)/structural unit (b)=25.3/58.3% by weight)
It was synthesized as in Production Example 9 described later.

[Resin C]
PC-C1: Bisphenol A polycarbonate
Product name: Iupilon S3000 (manufactured by Mitsubishi Engineering-Plastics Corporation)
PA-C1: Phenyl methacrylate/methyl acrylate=99/1 wt % copolymer
It was synthesized according to the method described in JP 2010-116501 A.

[Resin Constituting Resin Layer B of Multilayer Body]
BPA-PC: Bisphenol A polycarbonate
Product name: Novalex 7022R (manufactured by Mitsubishi Engineering-Plastics Corporation)
PMMA: Polymethacrylate
Product name: Acrypet MD001 (manufactured by Mitsubishi Chemical Corporation)
COP: Cycloolefin polymer
Product name: ZEON OR1420R (manufactured by Zeon Corporation)

(Production Example 1) Polycarbonate Resin: PC-A1

Polymerization of the polycarbonate resin was carried out using a continuous polymerization facility including three vertical stirring reactors, one horizontal stirring reactor, and a twin-screw extruder. ISB, CHDM, and DPC are each melted in a tank, and ISB, CHDM, and DPC were continuously supplied to the first vertical stirring reactor at flow rates of 29.8 kg/hr, 12.6 kg/hr, and 63.1 kg/hr, respectively (ISB/CHDM/DPC=0.700/0.300/1.010 in molar ratio). At the same time, an aqueous solution of calcium acetate monohydrate as a polymerization catalyst was supplied to the first vertical stirring reactor at an addition amount such that calcium acetate monohydrate was 1.5 µmol per 1 mol of all dihydroxy compounds. The internal temperature, internal pressure, and residence time of each reactor were set as follows: 190° C., 25 kPa, and 120 minutes for the first vertical stirring reactor, 195° C., 10 kPa, and 90 minutes for the second vertical stirring reactor, 205° C., 4 kPa, and 45 minutes for the third vertical stirring reactor, and 220° C., 0.1 to 1.0 kPa, and 120 minutes for the fourth horizontal stirring reactor. The operation was performed while finely adjusting the internal pressure of the fourth horizontal stirring reactor so that the reduced viscosity of the obtained polycarbonate resin was 0.42 dL/g to 0.44 dL/g. The polycarbonate resin extracted from the fourth horizontal stirring reactor was supplied in a molten state to a vent type twin-screw extruder TEX30α [manufactured by The Japan Steel Works, Ltd.]. The extruder has three vacuum vents, where residual low molecular weight components in the resin were removed by devolatilization, and 0.63 ppm by weight of phosphonic acid was added as a catalyst deactivator before the first vent to the polycarbonate resin, 1000 ppm by weight of Irganox 1010, 500 ppm by weight of AS2112, 3000 ppm by weight of E-275, and 200 ppm by weight of SEESORB709 were added to the polycarbonate resin before the third vent. The polycarbonate resin that passed through the extruder was continuously caused to pass through an Ultipleat candle filter (manufactured by PALL) with an opening of 10 µm in a molten state to filter foreign matters. Then, the polycarbonate resin was extruded in a strand form from the die, cooled with water, solidified, and then cut by a rotary cutter to be pelletized. The pelletized polycarbonate resin thus obtained is referred to as "PC-A1".

(Production Example 2) Polycarbonate Resin: PC-A2

The procedure of Production Example 1 was performed except that supply amounts of the raw materials were set as 21.3 kg/hr of ISB, 21.1 kg/hr of CHDM, and 62.9 kg/hr of DPC (ISB/CHDM/DPC=0.500/0.500/1.005 in molar ratio) and adjustment was performed so that the reduced viscosity of the obtained polycarbonate resin was 0.50 dL/g to 0.52 dL/g. The polycarbonate resin thus obtained is referred to as "PC-A2".

(Production Example 3) Polycarbonate Resin: PC-A3

The procedure of Production Example 1 was performed except that supply amounts of the raw materials were set as 27.3 kg/hr of ISB, 15.7 kg/hr of TCDDM, and 57.6 kg/hr DPC (ISB/TCDDM/DPC=0.700/0.300/1.007 in molar ratio), the addition amount of calcium acetate monohydrate was set to 1.5 µmol per 1 mol of all dihydroxy compounds, adjustment was performed so that the reduced viscosity of the obtained polycarbonate resin was 0.38 dL/g to 0.40 dL/g, and the addition amount of phosphonic acid was set to 1.3 ppm by weight with respect to the polycarbonate resin. The polycarbonate resin thus obtained is referred to as "PC-A3".

The content of ISB structural unit in PC-A3 is 53.9° by weight, and the content of TCDDM structural unit is 31.1% by weight.

(Production Example 4) Polycarbonate Resin: PC-B1

The procedure of Production Example 1 was performed except that supply amounts of the raw materials were set as 17.1 kg/hr of ISB, 25.3 kg/hr of CHDM, and 62.6 kg/hr of DPC (ISB/CHDM/DPC=0.400/0.600/1.000 in molar ratio), the addition amount of calcium acetate monohydrate was set to 3 µmol per 1 mol of all dihydroxy compounds, adjustment was performed so that the reduced viscosity of the obtained polycarbonate resin was 0.66 dL/g to 0.68 dL/g, and the addition amount of phosphonic acid was set to 1.3 ppm by weight with respect to the polycarbonate resin. The polycarbonate resin thus obtained is referred to as "PC-B1".

(Production Example 5) Polycarbonate Resin: PC-B2

The Procedure of Production Example 1 was Performed except that supply amounts of the raw materials were set as 15.0 kg/hr of ISB, 27.4 kg/hr of CHDM, and 62.7 kg/hr of DPC (ISB/CHDM/DPC=0.350/0.650/1.000 in molar ratio), the addition amount of calcium acetate monohydrate was set to 3 µmol per 1 mol of all dihydroxy compounds, adjustment was performed so that the reduced viscosity of the obtained carbonate resin was 0.73 dL/g to 0.75 dL/g, and the addition amount of phosphonic acid was 1.3 ppm by weight with respect to the polycarbonate resin. The polycarbonate resin thus obtained is described as "PC-B2".

(Production Example 6) Polycarbonate Resin: PC-B3

The procedure of Production Example 1 was performed except that supply amounts of the raw materials were set as 12.8 kg/hr of ISB, 29.6 kg/hr of CHDM, and 62.7 kg/hr of DPC (ISB/CHDM/DPC=0.300/0.700/1.000 in molar ratio), the addition amount of calcium acetate monohydrate was set to 3 µmol per 1 mol of all dihydroxy compounds, adjustment was performed so that the reduced viscosity of the obtained polycarbonate resin was 0.75 dL/g to 0.77 dL/g, and the addition amount of phosphonic acid was set to 1.3 ppm by weight with respect to the polycarbonate resin. The polycarbonate resin thus obtained is described as "PC-B3".

(Production Example 7) Polycarbonate Resin: PC-B4

The procedure of Production Example 1 was performed except that supply amounts of the raw materials were set as 15.0 kg/hr of ISB, 27.4 kg/hr of CHDM, and 63.3 kg/hr of DPC (ISB/CHDM/DPC=0.350/0.650/1.010), the addition amount of calcium acetate monohydrate was set to 3 µmol per 1 mol of all dihydroxy compounds, adjustment was performed so that the reduced viscosity of the obtained polycarbonate resin was 0.44 dL/g to 0.46 dL/g, and the addition amount of phosphonic acid was 1.3 ppm by weight with respect to the polycarbonate resin. The obtained polycarbonate resin is described as "PC-B4".

(Production Example 8) Polycarbonate Resin: PC-B5

The procedure of Production Example 1 was performed except that supply amounts of the raw materials were set as 12.8 kg/hr of ISB, 29.6 kg/hr of CHDM, and 63.3 kg/hr of DPC (ISB/CHDM/DPC=0.300/0.700/1.010 in molar ratio), the addition amount of calcium acetate monohydrate was set to 3 μmol per 1 mol of all dihydroxy compounds, adjustment was performed so that the reduced viscosity of the obtained polycarbonate resin was 0.44 dL/g to 0.46 dL/g, and the addition amount of phosphonic acid was set to 1.3 ppm by weight with respect to the polycarbonate resin. The polycarbonate resin thus obtained is referred to as "PC-B5".

(Production Example 9 Example 6) Polycarbonate Resin: PC-B6

The procedure of Production Example 1 was performed except that supply amounts of the raw materials were set as 12.8 kg/hr of ISB, 29.6 kg/hr of CHDM, and 63.7 kg/hr of DPC (ISB/CHDM/DPC=0.300/0.700/1.015 in molar ratio), the addition amount of calcium acetate monohydrate was set to 3 μmol per 1 mol of all dihydroxy compounds, adjustment was performed so that the reduced viscosity of the obtained polycarbonate resin was 0.38 dL/g to 0.40 dL/g, and the addition amount of phosphonic acid was set to 1.3 ppm by weight with respect to the polycarbonate resin. The polycarbonate resin thus obtained is referred to as "PC-B6".

Tables 1, 6, and 9 show structural units and physical properties of the first polycarbonate resin and the second polycarbonate resin obtained in the above-mentioned Production Examples. Note that, of the components constituting the first polycarbonate resin and the second polycarbonate resin, components other than the structural units shown in Tables 1, 6, and 9 are linking groups such as a carbonyl group. In addition, Table 6 shows the physical properties of the resin C (that is, PC-C1 and PA-C1). Table 1 shows structural units and physical properties of the resins used in Examples 1-1 to 1-10 and Comparative Examples 1-1 to 1-3 below. Table 6 shows structural units and physical properties of the resins used in Reference Examples 1 to 4, Examples 2-1 to 2-8, and Comparative Examples 2-1 to 2-3 below. Table 9 shows structural units and physical properties of the resins used in Examples 3-1 to 3-3 and Comparative Examples 3-1 to 3-3 below.

Example 1-1

After blending 700 parts by weight of pellets of the polycarbonate resin PC-A1 obtained in Production Example 1 and 300 parts by weight of pellets of the polycarbonate resin PC-B1 obtained in Production Example 4, a twin-screw extruder TEX30HSS equipped with a vacuum vent (manufactured by The Japan Steel Works, Ltd.) was used to perform extrusion kneading at a cylinder temperature of 240° C. and an extrusion rate of 18 kg/hr, thereby obtaining pellets of a polycarbonate resin composition. Next, the pellets of the resin composition were dried with a hot air dryer at a temperature of 90° C. for 5 hours, and then injection-molded using a 75-ton injection molding machine EC-75 [manufactured by Toshiba Machine Co., Ltd.]. The molding conditions were a mold temperature of 60° C. and a cylinder temperature of 240° C. Thus, a test piece composed of a plate-shaped molded article having a width of 100 mm, a length of 100 mm, and a thickness of 2 mm was obtained. Further, an ISO tensile test piece was obtained by performing molding in the same manner. From the ISO tensile test piece, a Charpy impact test piece with a notch of 0.25 mm was cut out to perform a Charpy impact test. The total light transmittance, YI, chemical resistance, and moist heat cycle resistance of the plate-shaped molded product were measured.

Examples 1-2 to 1-10, Comparative Examples 1-1 to 1-5

The same operation as in Example 1 was performed except that the composition was changed to that shown in Table 2. Further, various properties of Examples 1-1 to 1-10 and Comparative examples 1-1 to 1-5 were evaluated by the above-mentioned methods. The results are shown in Tables 3 to 5.

TABLE 1

| Polycarbonate Resin | | Structural Unit (a) % by weight | Structural Unit (b) % by weight | Glass Transition Temperature ° C. | Melt Viscosity Pa · s | Number Average Molecular Weight | Reduced Viscosity dL/g |
|---|---|---|---|---|---|---|---|
| First Polycarbonate Resin | PC-A1 | 58.8 | 24.9 | 128 | 2530 | 10000 | 0.43 |
| | PC-A2 | 42.1 | 41.5 | 102 | 1710 | 12500 | 0.51 |
| Second Polycarbonate Resin | PC-B1 | 33.7 | 49.9 | 94 | 2520 | 17800 | 0.67 |
| | PC-B2 | 29.5 | 54.1 | 90 | 2700 | 19300 | 0.74 |
| | PC-B3 | 25.3 | 58.3 | 85 | 2400 | 20200 | 0.76 |
| | PC-B4 | 29.5 | 54.1 | 86 | 340 | 10800 | 0.45 |
| | PC-B5 | 25.3 | 58.3 | 78 | 270 | 10700 | 0.45 |
| | PC-B6 | 25.3 | 58.3 | 75 | 110 | 8800 | 0.39 |

TABLE 2

| Type of Resin | | Unit | Examples | | | | | | | | | | Comparative Examples | | | | |
|---|---|---|---|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 | 1-1 | 1-2 | 1-3 | 1-4 | 1-5 |
| First Polycarbonate Resin | PC-A1 | % by weight | 70 | 70 | 90 | 70 | 70 | 90 | 80 | 70 | 90 | 80 | 100 | — | 50 | 25 | 50 |
| | PC-A2 | % by weight | — | — | — | — | — | — | — | — | — | — | — | 100 | 50 | 75 | — |

TABLE 2-continued

| Type of Resin | | Unit | Examples | | | | | | | | | | Comparative Examples | | | | |
|---|---|---|---|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 | 1-1 | 1-2 | 1-3 | 1-4 | 1-5 |
| Second Polycarbonate Resin | PC-B1 | % by weight | 30 | — | — | — | — | — | — | — | — | — | — | — | — | — | — |
| | PC-B2 | % by weight | — | 30 | — | — | — | — | — | — | — | — | — | — | — | — | — |
| | PC-B3 | % by weight | — | — | 10 | 30 | — | — | — | — | — | — | — | — | — | — | 50 |
| | PC-B4 | % by weight | — | — | — | — | 30 | — | — | — | — | — | — | — | — | — | — |
| | PC-B5 | % by weight | — | — | — | — | — | 10 | 20 | 30 | — | — | — | — | — | — | — |
| | PC-B6 | % by weight | — | — | — | — | — | — | — | — | 10 | 20 | — | — | — | — | — |

TABLE 3

| Items | | Unit | Examples | | | | Comparative Examples | | | | |
|---|---|---|---|---|---|---|---|---|---|---|---|
| | | | 1-1 | 1-2 | 1-3 | 1-4 | 1-1 | 1-2 | 1-3 | 1-4 | 1-5 |
| Phase Separation | Glass Transition Temperature | ° C. | 93 | 86 | 73 | 78 | 129 | 105 | 118 | 111 | 73 |
| | Glass Transition Temperature | ° C. | 129 | 130 | 129 | 131 | — | — | — | — | 129 |
| | Glass Transition Temperature | ° C. | — | — | — | — | — | — | — | — | — |
| | Number of Times of Glass Transition Temperature | — | 2 | 2 | 2 | 2 | 1 | 1 | 1 | 1 | 2 |
| Transparency | Total Light Transmittance | % | 92 | 92 | 92 | 92 | 92 | 92 | 92 | 92 | 92 |
| Color Tone | YI | | 1.9 | 1.9 | 2.2 | 1.9 | 1.2 | 1.1 | 1.2 | 1.1 | 1.6 |
| Heat Resistance | HDT | ° C. | 95 | 94 | 98 | 93 | 104 | 82 | 90 | 87 | 80 |
| Impact Resistance | Charpy Impact Strength | kJ/m² | 10 | 13 | 9 | 13 | 7 | 9 | 8 | 9 | 30 |
| Moist Heat Resistance | Number of Test until Occurrence of Cracks | — | >35 | >35 | >35 | >35 | 9 | 25 | 5 | 15 | >35 |

TABLE 4

| Items | | Unit | Examples | | Comparative Example |
|---|---|---|---|---|---|
| | | | 1-3 | 1-4 | 1-1 |
| Fluidity | MFR | g/10 min | 10 | 8 | 10 |
| Chemical Resistance | Critical Strain | % | 0.44 | 0.42 | 0.24 |

TABLE 5

| Items | | Unit | Examples | | | | | | Comparative Examples | | |
|---|---|---|---|---|---|---|---|---|---|---|---|
| | | | 1-5 | 1-6 | 1-7 | 1-8 | 1-9 | 1-10 | 1-1 | 1-2 | 1-3 |
| Phase Separation | Glass Transition Temperature | ° C. | 81 | 71 | 74 | 75 | 74 | 72 | 129 | 105 | 118 |
| | Glass Transition Temperature | ° C. | 130 | 130 | 131 | 93 | 131 | 129 | — | — | — |
| | Glass Transition Temperature | ° C. | — | — | 130 | — | — | — | — | — | — |
| | Number of Times of Glass Transition on Temperature | — | 2 | 2 | 2 | 3 | 2 | 2 | 1 | 1 | 1 |

TABLE 5-continued

|  |  |  | Examples | | | | | | Comparative Examples | | |
|---|---|---|---|---|---|---|---|---|---|---|---|
| Items |  | Unit | 1-5 | 1-6 | 1-7 | 1-8 | 1-9 | 1-10 | 1-1 | 1-2 | 1-3 |
| Fluidity | MFR | g/10 min | 16 | 12 | 15 | 16 | 13 | 15 | 10 | 13 | 12 |
|  | Spiral Flow | mm | 338 | 275 | 306 | 344 | 288 | 321 | 260 | — | — |
| Transparency | Total Light Transmittance | % | 92 | 92 | 92 | 92 | 92 | 92 | 92 | 92 | 92 |
| Heat Resistance | HDT | ° C. | 94 | 98 | 94 | 92 | 97 | 93 | 104 | 82 | 90 |
| Impact Resistance | Charpy Impact Strength | kJ/m² | 8 | 7 | 11 | 11 | — | — | 7 | 9 | 8 |

As shown in Tables 3 to 5, it can be seen that the polycarbonate resin compositions of Examples 1-1 to 1-10 are excellent in transparency and heat resistance, and excellent further in one or more properties of moldability, chemical resistance, and moist heat resistance.

More specifically, as known from Table 3, while the resin compositions of Comparative Example 1-1 are inferior in moist heat resistance and cracks are generated at an early stage, the resin compositions of Examples 1-1 to 1-4 have significantly improved moist heat resistance. On the other hand, in Comparative Examples 1-2 and 1-5, the moist heat crack resistance is excellent, but the heat resistance is poor. In Comparative Examples 1-3 and 1-4, since the copolymerization composition ratios of the two components are close to each other, they do not have a phase-separated structure and have a single glass transition temperature, so that the moist heat crack resistance is poor. Further, as known from Table 3 and Table 4, the resin compositions of Examples 1-3 and 1-4 are excellent in transparency, color tone, heat resistance, impact resistance, fluidity, and chemical resistance. Further, as known from Table 5, the resin compositions of Examples 1-5 to 1-10 are excellent in transparency, color tone, heat resistance, impact resistance, and fluidity. On the other hand, the resin compositions of Comparative Examples 1-1 to 1-3 are inferior in fluidity.

Next, Reference Examples, Examples, and Comparative Examples of resin compositions containing a resin C in addition to the first polycarbonate resin and the second polycarbonate resin will be described. First, in order to explain the compatibility of each combination of the first polycarbonate resin, the second polycarbonate resin, and the resin C, a reference example of a polycarbonate resin composition containing two types of resins will be shown.

Reference Example 1

After blending 80 parts by weight of pellets of PC-A1 and 20 parts by weight of powder of PC-C1, a twin-screw extruder TEX30HSS equipped with a vacuum vent [manufactured by The Japan Steel Works, Ltd.] was used to perform extrusion-kneading at a cylinder temperature of 260° C. and an extrusion rate of 12 kg/hr to obtain a pellet of a polycarbonate resin composition (see Table 7). The obtained pellet was cloudy. As a result of measuring the glass transition temperature by dynamic viscoelasticity measurement using this pellet, two glass transition temperatures were detected. From this result, it can be judged that PC-A1 and PC-C1 are incompatible.

Reference Example 2

The same procedure as in Reference Example 1 was performed except that 80 parts by weight of pellets of PC-A1 and 20 parts by weight of powder of PA-C1 were used and the cylinder temperature of the extruder was set to 240° C. (see Table 7). The obtained pellet was cloudy and two glass transition temperatures were detected, and thus it can be judged that PC-A1 and PA-C1 are incompatible.

Reference Example 3

The same procedure as in Reference Example 1 was performed except that 80 parts by weight of pellets of PC-B3 and 20 parts by weight of powder of PC-C1 were used (see Table 7). The obtained pellet was transparent, and one glass transition temperature was detected between the glass transition temperatures of PC-B3 and PC-C1, and thus it can be judged that PC-B3 and PC-C1 are compatible.

Reference Example 4

The same procedure as in Reference Example 1 was performed except that 80 parts by weight of pellets of PC-B3 and 20 parts by weight of powder of PA-C1 were used and the cylinder temperature of the extruder was set to 240° C. (see Table 7). The obtained pellet was transparent, and one glass transition temperature was detected between the glass transition temperatures of PC-B3 and PA-C1, and thus it can be judged that PC-B3 and PA-C1 are compatible.

Example 2-1

After blending 90 parts by weight of pellets of PC-A1, 9.76 parts by weight of pellets of PC-B1, and 0.24 parts by weight of powder of PC-C1, a twin-screw extruder TEX30HSS equipped with a vacuum vent [The Japan Steel Works, Ltd.] was used to perform extrusion-kneading at a cylinder temperature of 240° C. and an extrusion rate of 12 kg/hr to obtain a pellet of a polycarbonate resin composition. Next, the pellets of the resin composition were dried with a hot air dryer at a temperature of 90° C. for 5 hours, and then injection-molded using a 75-ton injection molding machine EC-75 [manufactured by Toshiba Machine Co., Ltd.]. The molding conditions were a mold temperature of 60° C. and a cylinder temperature of 240° C. Thus, a test piece composed of a plate-shaped molded article having a width of 100 mm, a length of 100 mm, and a thickness of 2 mm was obtained. Further, an ISO tensile test piece was obtained by performing molding in the same manner. From the ISO tensile test piece, a Charpy impact test piece with a notch of 0.25 mm was cut out to perform a Charpy impact test. The total light transmittance, haze, YI, chemical resistance, and moist heat cycle resistance of the plate-shaped molded article were measured. The results are shown in Table 8.

Examples 2-2 to 2-8, Comparative Examples 2-1 to 2-3

The same operation as in Example 2-1 was performed except that the composition was changed to those shown in Table 3. In addition, various properties of Examples 2-1 to 2-8 and Comparative Examples 2-1 to 2-3 were evaluated by the methods described above. The results are shown in Table 8.

TABLE 6

| Type of Resin | | Structural Unit (a) % by weight | Structural Unit (b) parts by weight | Structural Unit (c) % by weight | Structural Unit (d) % by weight | Glass Transition Temperature ° C. | Melt Viscosity Pa·s | Number Average Molecular Weight | Reduced Viscosity dL/g | Refractive Index 589 nm |
|---|---|---|---|---|---|---|---|---|---|---|
| Resin A | PC-A1 | 58.8 | 24.9 | — | — | 128 | 2530 | 10000 | 0.43 | 1.501 |
|  | PC-A2 | 42.1 | 41.5 | — | — | 102 | 1710 | 12500 | 0.51 | 1.500 |
| Resin B | PC-B3 | 25.3 | 58.3 | — | — | 85 | 2400 | 20200 | 0.76 | 1.499 |
| Resin C | PC-C1 | — | — | 89.0 | — | 152 | — | — | — | 1.585 |
|  | PA-C1 | — | — | — | 100.0 | 93 | — | — | — | 1.569 |

TABLE 7

| Reference Examples No. | | | | Reference Example 1 | Reference Example 2 | Reference Example 3 | Reference Example 4 |
|---|---|---|---|---|---|---|---|
| Composition | Resin A | PC-A1 | parts by weight | 80 | 80 | — | — |
|  | Resin B | PC-B3 | parts by weight | — | — | 80 | 80 |
|  | Resin C | PC-C1 | parts by weight | 20 | — | 20 | — |
|  |  | PA-C1 | parts by weight | — | 20 | — | 20 |
| Compatibility | Appearance of Pellet after Extrusion Kneading | | — | Cloudy | Cloudy | Transparent | Transparent |
|  | Glass Transition Temperature | | ° C. | 128 | 128 | 98 | 87 |
|  |  | | ° C. | 152 | 93 | | |
|  | Number of Times of Glass Transition Temperature Determinatnion | | — | 2 | 2 | 1 | 1 |
|  |  | | — | Incompatible | Incompatible | Compatible | Compatible |

TABLE 8

| Example No. | | | | Example 2-1 | Example 2-2 | Example 2-3 | Example 2-4 | Example 2-5 | Example 2-6 |
|---|---|---|---|---|---|---|---|---|---|
| Blending | Resin A | PC-A1 | parts by weight | 90.00 | 90.00 | 90.00 | 70.00 | 70.00 | 70.00 |
|  |  | PC-A2 | parts by weight | — | — | — | — | — | — |
|  | Resin B | PC-B3 | parts by weightt | 9.76 | 9.70 | 10.00 | 29.28 | 29.10 | 30.00 |
|  | Resin C | PC-C1 | parts by weight | 0.24 | — | — | 0.72 | — | — |
|  |  | PA-C1 | % by weight | — | 0.30 | — | — | 0.90 | — |
| Phase Separation | Glass Transition Temperature | | ° C. | 74 | 72 | 73 | 78 | 77 | 78 |
|  | Glass Transition Temperature | | ° C. | 129 | 129 | 129 | 130 | 131 | 131 |
|  | Number of Glass Transition temperature | | — | 2 | 2 | 2 | 2 | 2 | 2 |
| Evaluation | Color Tone (YI) | | — | 2.0 | 2.1 | 2.2 | 1.7 | 2.0 | 1.9 |
|  | Heat Resistance (HDT) | | | 99 | 98 | 98 | 94 | 93 | 93 |
|  | Total Light Transmittance 25° C. | | % | 92.3 | 92.2 | 92.0 | 92.2 | 92.2 | 91.7 |
|  | Total Light Transmittance 90° C. | | % | 91.4 | 91.6 | 89.7 | 91.4 | 91.2 | 89.1 |
|  | Δ trans | | % | −0.8 | −0.6 | −2.3 | −0.8 | −1.0 | −2.6 |
|  | Haze 25° C. | | % | 0.4 | 0.4 | 0.9 | 0.6 | 0.6 | 2.6 |
|  | Haze 90° C. | | % | 1.5 | 1.4 | 3.3 | 4.8 | 5.0 | 12.4 |

TABLE 8-continued

|  |  |  |  |  |  |  |  |
|---|---|---|---|---|---|---|---|
| Δ haze | % | 1.1 | 0.9 | 2.3 | 4.2 | 4.4 | 9.8 |
| Impact Resistance (Charpy Impact Strength) | kJ/m² | 9 | 9 | 9 | 4 | 13 | 13 |
| Moist Heat Resistance (Number of Test until Occurrence of Cracks) | — | >35 | >35 | >35 | >35 | >35 | >35 |
| Chemical Resistance (Critical Strain) | % | 0.45 | 0.44 | 0.44 | 0.45 | 0.43 | 0.42 |

| Example No. | | | | Example 2-7 | Example 2-8 | Comparative Example 2-1 | Comparative Example 2-2 | Comparative Example 2-3 |
|---|---|---|---|---|---|---|---|---|
| Blending | Resin A | PC-A1 | parts by weight | 70.00 | 70.00 | 100.00 | — | 50.00 |
|  |  | PC-A2 | parts by weight | — | — | — | 100.00 | 50.00 |
|  | Resin B | PC-B3 | parts by weightt | 27.00 | 27.00 | — | — | — |
|  | Resin C | PC-C1 | parts by weight | 3.00 | — | — | — | — |
|  |  | PA-C1 | % by weight | — | 3.00 | — | — | — |
| Phase Separation | Glass Transition Temperature | | °C. | 79 | 77 | 129 | 105 | 118 |
|  | Glass Transition Temperature | | °C. | 130 | 131 | — | — | — |
|  | Number of Glass Transition temperature | | — | 2 | 2 | 1 | 1 | 1 |
| Evaluation | Color Tone (YI) | | — | 2.0 | 2.1 | 1.2 | 1.1 | 1.2 |
|  | Heat Resistance (HDT) | | | 94 | 94 | 104 | 82 | 90 |
|  | Total Light Transmittance 25° C. | | % | 89.8 | 89.7 | 92.5 | 92.6 | 92.5 |
|  | Total Light Transmittance 90° C. | | % | 91.5 | 91.5 | 92.5 | 92.5 | 92.6 |
|  | Δ trans | | % | 1.7 | 1.8 | 0.0 | −0.1 | 0.1 |
|  | Haze 25° C. | | % | 3.0 | 2.7 | 0.3 | 0.3 | 0.3 |
|  | Haze 90° C. | | % | 4.0 | 4.1 | 0.4 | 0.3 | 0.4 |
|  | Δ haze | | % | 1.0 | 1.4 | 0.0 | 0.0 | 0.1 |
|  | Impact Resistance (Charpy Impact Strength) | | kJ/m² | 13 | 14 | 7 | 9 | 8 |
|  | Moist Heat Resistance (Number of Test until Occurrence of Cracks) | | — | >35 | >35 | 9 | 25 | 5 |
|  | Chemical Resistance (Critical Strain) | | % | 0.44 | 0.43 | 0.24 | 0.29 | 0.26 |

As known from Table 8, the polycarbonate resin compositions of Examples 2-1 to 2-8 are excellent in a plurality of properties such as transparency, heat resistance, color tone, moldability, chemical resistance, moist heat resistance, and impact resistance in a well-balanced manner. Further, when further containing the resin C together with the first polycarbonate resin (that is, the resin A) and the second polycarbonate resin (that is, the resin B), the transparency at high temperature is improved, the molded article of the resin composition can maintain high transparency at both room temperature and high temperature.

On the other hand, Comparative Example 2-1 and Comparative Example 2-2, which are made of a single resin, do not change in transparency due to temperature change, but are inferior in moist heat resistance and chemical resistance. Comparative Example 2-3 is a composition made of two types of resins, but since they are compatible with each other to thereby form a uniform structure, the moist heat resistance and chemical resistance to be exhibited by the phase separation structure are not obtained.

Next, Examples and Comparative Examples of a multilayer body including at least the resin layer A containing the resin composition will be described.

Example 3-1

After blending 90 parts by weight of pellets of PC-A1 and 10 parts by weight of pellets of PC-B5, a twin-screw extruder TEX30HSS equipped with a vacuum vent [manufactured by The Japan Steel Works, Ltd.] was used to perform extrusion-kneading at a cylinder temperature of 240° C. and an extrusion rate of 12 kg/hr to obtain a pellet of the polycarbonate resin composition. Various properties of the polycarbonate resin composition were evaluated according to the methods described above. The results are shown in Table 10.

Example 3-2 to Example 3-3, Comparative Example 3-1 to Comparative Example 3-3

The same operation as in Example 3-1 was performed, except that the composition was changed to those shown in Table 10. Further, for Example 3-2, Example 3-3, and Comparative Examples 3-1 to 3-3, various properties of the polycarbonate resin compositions were evaluated by the methods described above. The results are shown in Table 10.

TABLE 9

| Type of Resin | | Structural Unit (a) % by weight | Structural Unit (b) % by weight | Glass Transition Temperature °C. | Melt Viscosity Pa·s | Number Average Molecular Weight | Reduced Viscosity dL/g |
|---|---|---|---|---|---|---|---|
| First Polycarbonate Resin | PC-A1 | 58.8 | 24.9 | 128 | 2530 | 10000 | 0.43 |
| | PC-A3 | 53.9 | 31.1 | 135 | 3520 | 14500 | 0.39 |
| Second Polycarbonate Resin | PC-B5 | 25.3 | 58.3 | 78 | 270 | 10700 | 0.45 |

TABLE 10

| Example and Comparative Example No. | | | Example 3-1 | Example 3-2 | Example 3-3 | Comparative Example 3-1 | Comparative Example 3-2 | Comparative Example 3-3 |
|---|---|---|---|---|---|---|---|---|
| Blending for Resin Composition | PC-A1 | parts by weight | 90 | 70 | — | 100 | — | — |
| | PC-A3 | parts by weight | — | — | 80 | — | 100 | — |
| | PC-B5 | parts by weight | 10 | 30 | 20 | — | — | 100 |
| Properties of Resin Composition | Glass Transition Temperature | °C. | 130 | 130 | 136 | 128 | 135 | 78 |
| | | °C. | 71 | 71 | 71 | — | — | — |
| | Melt Viscosity | Pa·s | 1980 | 1470 | 2200 | 2530 | 3520 | 270 |
| | Heat Resistance (HDT) | °C. | 97 | 92 | 100 | 104 | 111 | 64 |
| | Color Tone (YI) | — | 1.7 | 1.5 | 1.7 | 1.2 | 1.9 | 1.1 |
| | Total Light Transmittance | % | 92.0 | 91.5 | 91.8 | 92.5 | 92.4 | 92.5 |
| | Haze | % | 0.9 | 2.6 | 1.1 | 0.3 | 0.3 | 0.3 |
| | Pencil Hardness | — | F | HB | H | F | H | 2B |
| | Photoelastic Coefficient | ×10⁻¹² Pa⁻¹ | 20 | 22 | 12 | 19 | 9 | 28 |
| | Surface Impact Test | — | Ductility | Ductility | Ductility | Ductility | Brittleness | Ductility |
| | Chemical Resistance (Critical Strain) | % | 0.44 | 0.42 | 0.40 | 0.24 | 0.20 | 0.45 |
| | Weather resistance (Δ YI) | — | 0.01 | 0.03 | 0.05 | −0.05 | 0.05 | 0.10 |
| Warpage of Multilayer Body | BPA-PC | mm | 2 | −1 | 2 | 16 | 13 | 8 |
| | PMMA | mm | 0 | −3 | 2 | 5 | 6 | −12 |
| | COP | mm | 3 | 1 | 2 | 12 | 10 | 8 |

As known from Table 10, the resin compositions of Examples 3-1 to 3-3 are excellent in a plurality of properties such as transparency, heat resistance, color tone, moldability, chemical resistance, mechanical properties, weather resistance, and optical properties in good balance. In addition, in the multilayer bodies including the resin layers containing the resin compositions of Examples 3-1 to 3-3, warpage generated under use environment or storage environment was suppressed.

On the other hand, in Comparative Example 3-1 and Comparative Example 3-2, the resin compositions contained the first polycarbonate resin, but did not contain the second polycarbonate resin. In this case, the warpage of the multilayer body was large. In Comparative Example 3-3, the resin composition contained the second polycarbonate resin, but did not contain the first polycarbonate resin. Also, in this case, the warpage of the multilayer body was large.

The invention claimed is:

1. A polycarbonate resin composition, comprising:
a first polycarbonate resin comprising at least 40% by weight of a structural unit of the formula (1);

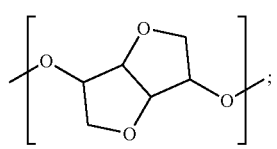
(1)

a second polycarbonate resin comprising from 1% to less than 40% by weight of the structural unit of the formula (1), wherein a weight ratio of the first polycarbonate resin to the second polycarbonate resin, as first polycarbonate resin/second polycarbonate resin, is from 55/45 to 99/1, and wherein the polycarbonate resin composition has at least two glass transition temperatures.

2. The composition of claim 1, wherein at least one selected from the group consisting of the first polycarbonate resin and the second polycarbonate resin comprises a structural unit derived from at least one dihydroxy compound selected from the group consisting of an aliphatic dihydroxy compound, an alicyclic dihydroxy compound, and an ether group-containing dihydroxy compound other than a dihydroxy compound forming the structural unit of the formula (1).

3. The composition of claim 1, wherein the first polycarbonate resin comprises from 40 to 80% by weight of the structural unit of the formula (1).

4. The composition of claim 1, wherein the second polycarbonate resin comprises from 1 to 35% by weight of the structural unit of the formula (1).

5. The composition of claim 1, wherein the second polycarbonate resin has a number average molecular weight, measured by $^1$H-NMR, of from 17,000 to 50,000.

6. The composition of claim 1, wherein the second polycarbonate resin has a number average molecular weight, measured by $^1$H-NMR, B of from 6000 to 12000.

7. The composition of claim 1, wherein the second polycarbonate resin has a melt viscosity of from 1800 to 3000 Pa·s at a measurement temperature of 220° C. and a shear rate of 91.2 sec$^{-1}$.

8. The composition of claim 1, wherein the second polycarbonate resin has a melt viscosity of from 80 to 500 Pa·s at a measurement temperature of 220° C. and a shear rate of 91.2 sec$^{-1}$.

9. The composition of claim 1, wherein the second polycarbonate resin has a glass transition temperature of from 40 to 80° C.

10. The composition of claim 1, wherein the second polycarbonate resin comprises at least 45% by weight of a structural unit of the formula (2):

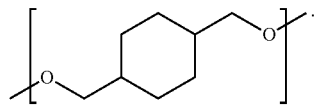

(2)

11. The composition of claim 1, further comprising:

a third polycarbonate resin comprising at least 50% by weight of a structural unit of the formula (3):

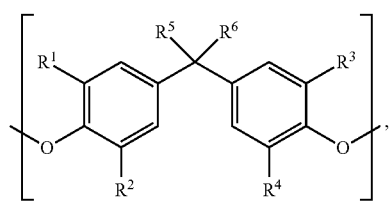

(3)

wherein $R^1$ to $R^6$ are independently H or an optionally substituted alkyl group comprising 1 to carbon atoms, and/or an acrylic resin comprising at least 50% by weight of a structural unit of the formula (4):

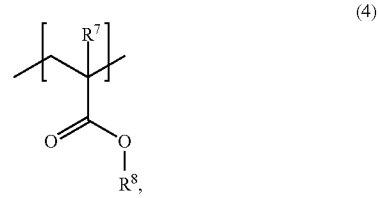

(4)

wherein $R^7$ is H or an optionally substituted alkyl group comprising 1 to 10 carbon atoms, and $R^8$ is an optionally substituted aryl group or an optionally substituted aralkyl group.

12. The composition of claim 11, comprising, with respect to 100 parts by weight of a total of the first polycarbonate resin, the second polycarbonate resin, the third polycarbonate resin, and the acrylic resin:

from 60 to 95 parts by weight of the first polycarbonate resin;

from 3 to less than 40 parts by weight of the second polycarbonate resin; and from 0.01 to 2 parts by weight of a total of the third polycarbonate resin and the acrylic resin.

13. The composition of claim 11, wherein the first polycarbonate resin and the second polycarbonate resin each comprise a structural unit of the formula (2)

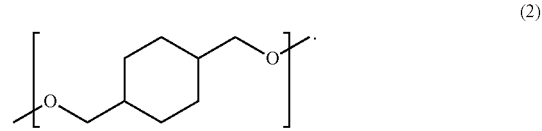

(2)

14. The composition of claim 11, wherein a glass transition temperature of the first polycarbonate resin is from 90 to 160° C., and wherein a glass transition temperature of the second polycarbonate resin is from 40 to 110° C.

15. A molded article, comprising:

the composition of claim 1.

16. The article of claim 15, in the form of an automobile interior part or an automobile exterior part.

17. The article of claim 15, configured for an on-vehicle display, a car navigation, a car audio, a console panel, a dashboard, or a door trim article.

18. A multilayer body, comprising:

a resin layer A comprising the composition of claim 1; and a resin layer B comprising a resin different from the resin layer A.

19. The multilayer body of claim 18, wherein, in a cross section in a layered direction of the multilayer body, a layered structure of the resin layer A and the resin layer B is asymmetric across a center line of a thickness of the multilayer body in terms of thickness and/or material.

20. The multilayer body of claim 18, having a total thickness in a range of from 10 to 500 μm.

21. The multilayer body of claim 18, wherein a thickness ratio of the resin layer A to the resin layer B, as resin layer B/resin layer A, is in a range of from 0.02 to 50.

22. The multilayer body of claim 18, wherein the second polycarbonate resin comprises a structural unit of formula (2)
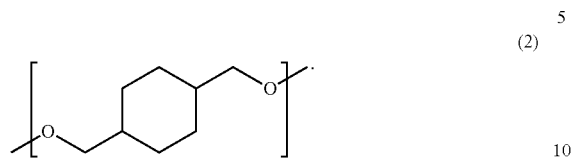
(2)
23. The multilayer body of claim 18, wherein a glass transition temperature of the first polycarbonate resin is in a range of from 90 to 160° C., and
wherein a glass transition temperature of the second polycarbonate resin is in a range of from 40 to 80° C.
* * * * *